O. MALCHER.
AUTOMATIC COMPUTING AND REGISTERING SCALE.
APPLICATION FILED FEB. 19, 1915.

1,335,067.

Patented Mar. 30, 1920.
13 SHEETS—SHEET 1.

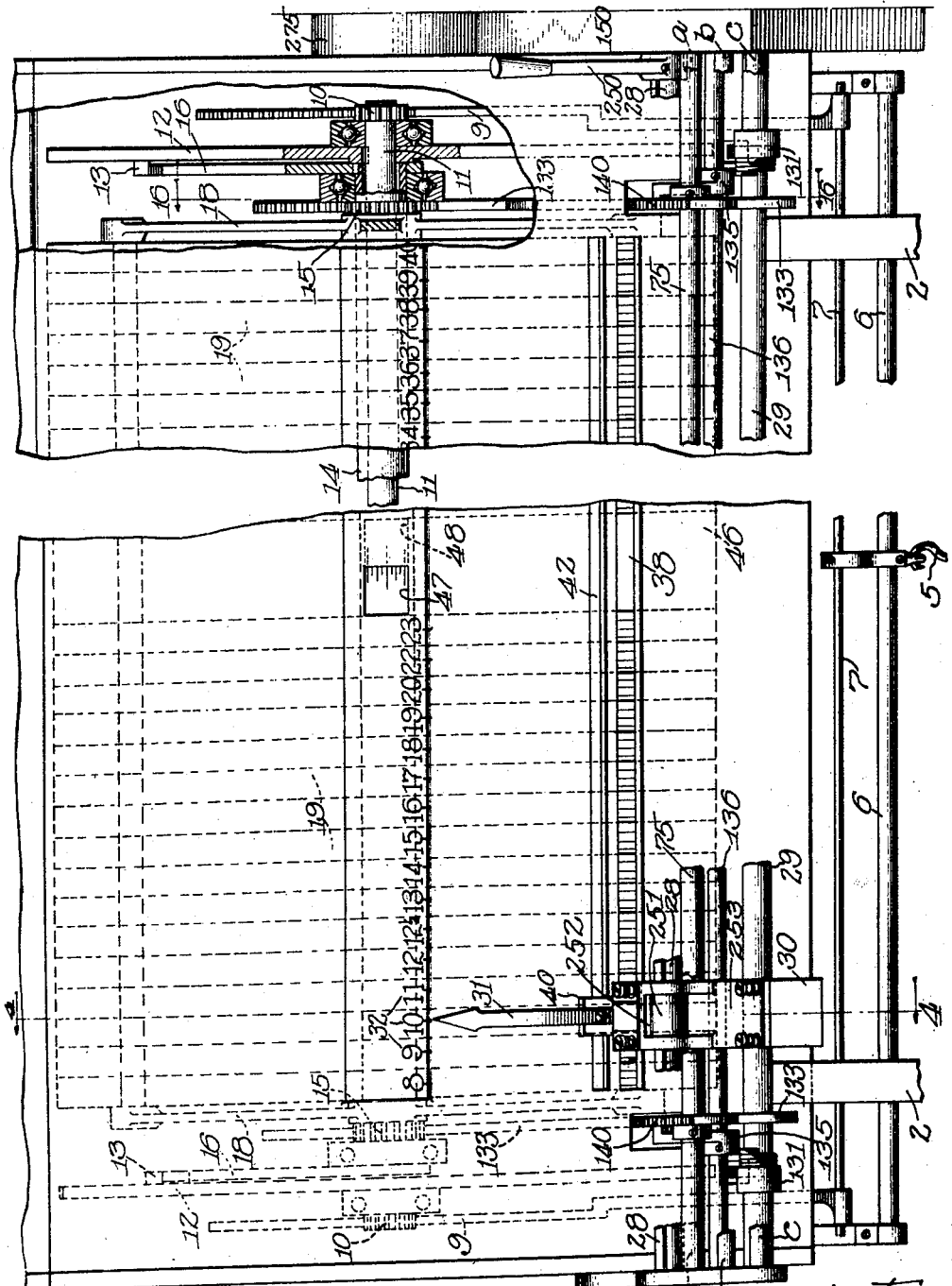

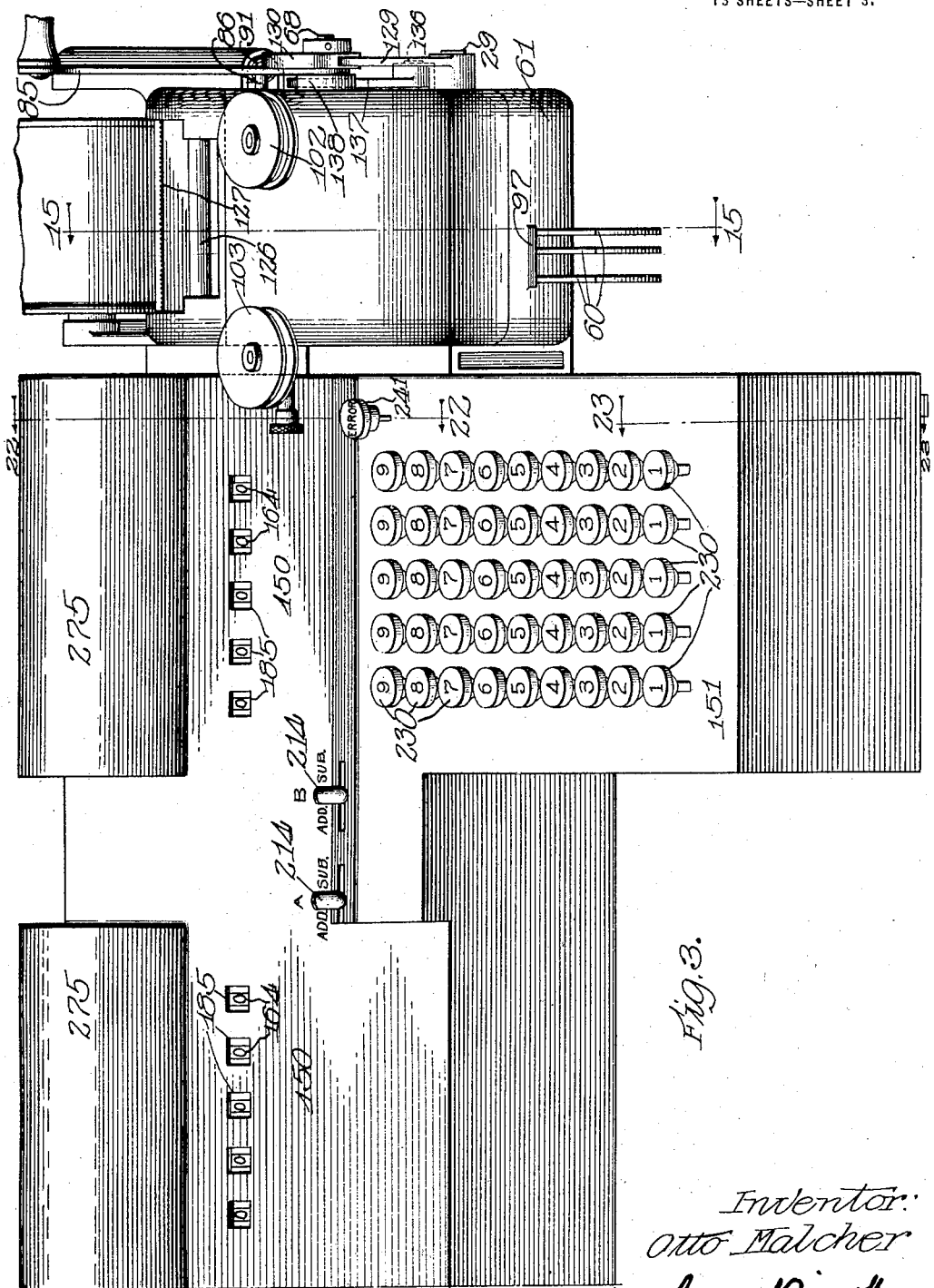

O. MALCHER.
AUTOMATIC COMPUTING AND REGISTERING SCALE.
APPLICATION FILED FEB. 19, 1915.
1,335,067.
Patented Mar. 30, 1920.
13 SHEETS—SHEET 4.
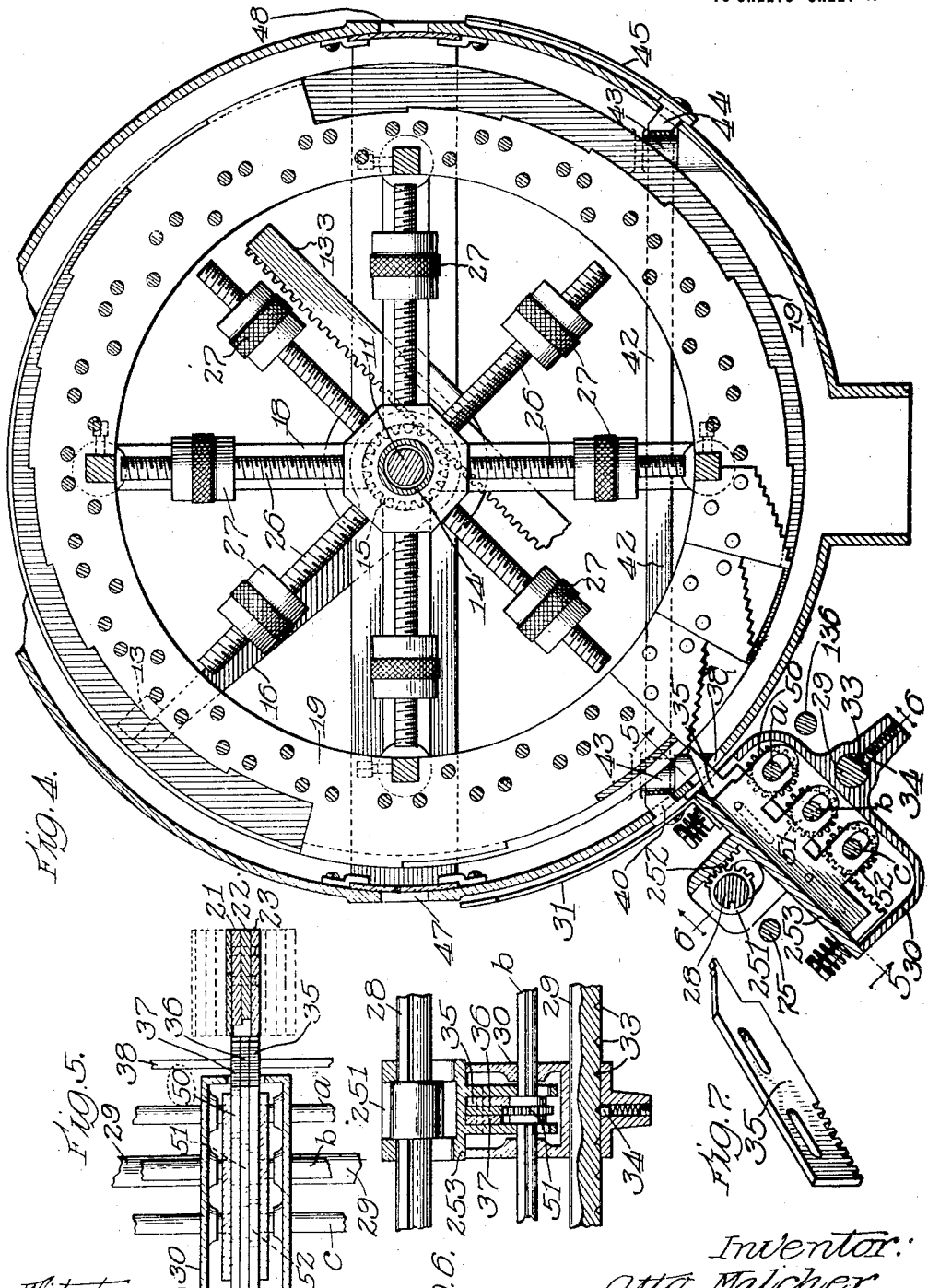

O. MALCHER.
AUTOMATIC COMPUTING AND REGISTERING SCALE.
APPLICATION FILED FEB. 19, 1915.

1,335,067. Patented Mar. 30, 1920.
13 SHEETS—SHEET 5.

Witnesses: G. W. Domarus Jr., A. J. Crane

Inventor: Otto Malcher
By Brown, Kissen & Sprville, Attys.

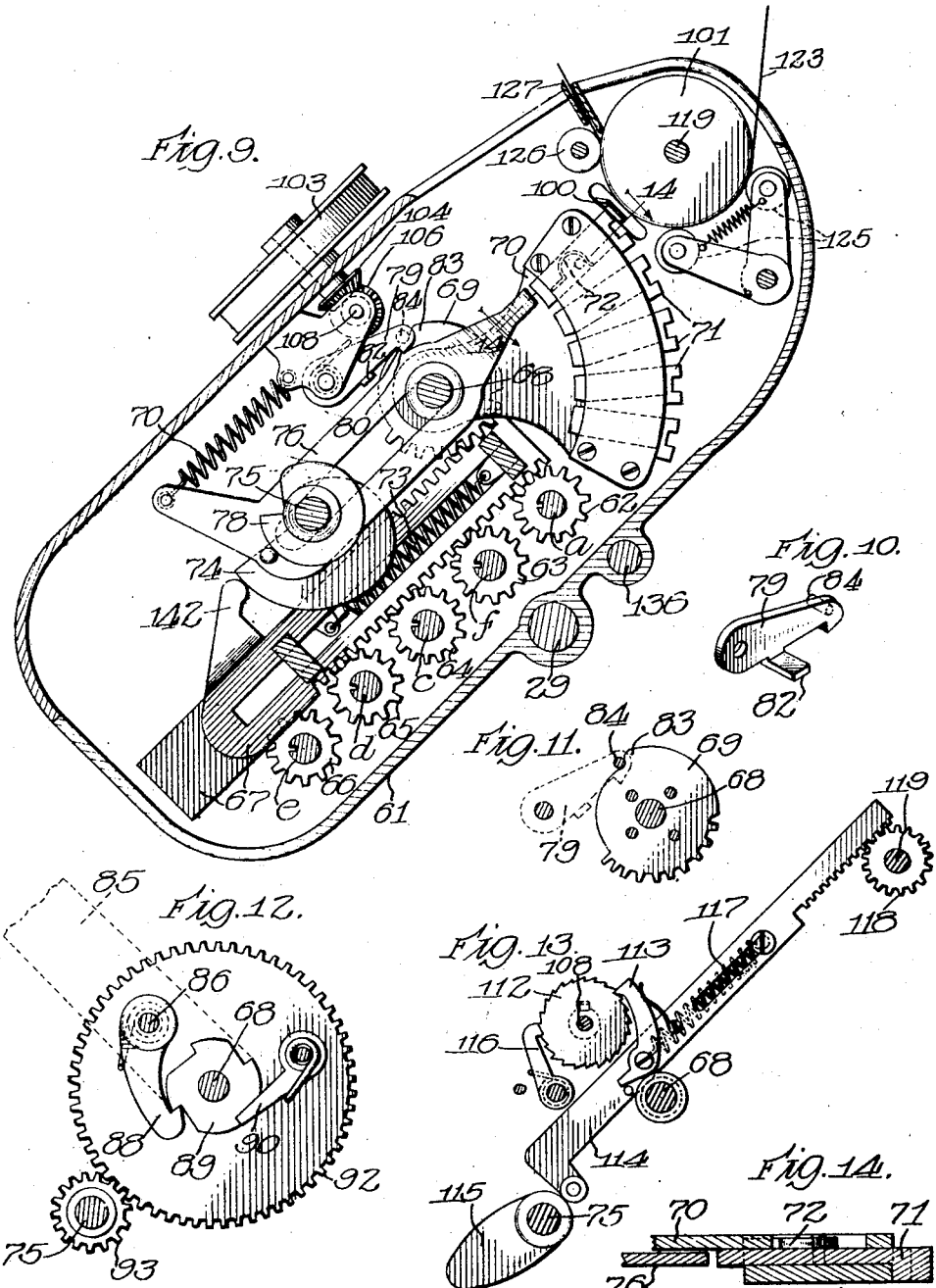

O. MALCHER.
AUTOMATIC COMPUTING AND REGISTERING SCALE.
APPLICATION FILED FEB. 19, 1915.
1,335,067. Patented Mar. 30, 1920.
13 SHEETS—SHEET 7.
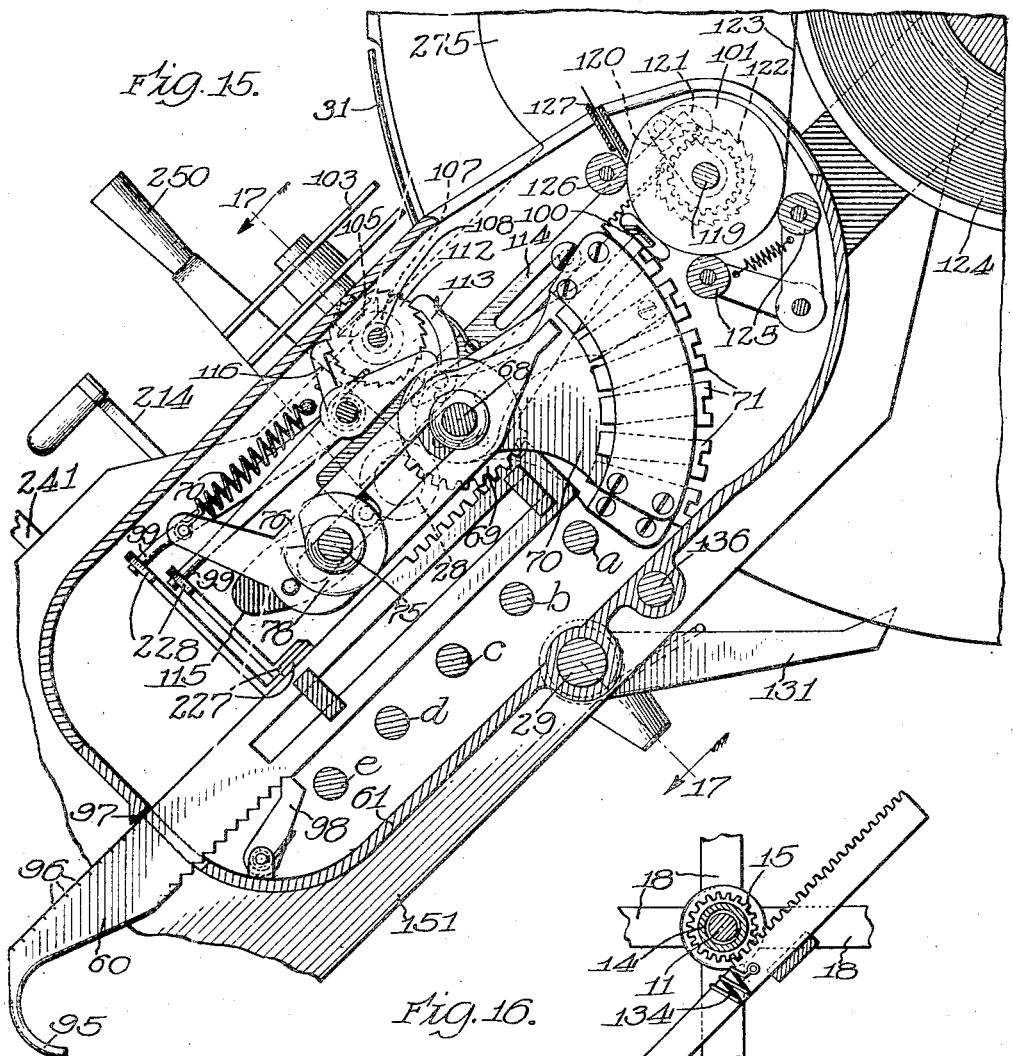

O. MALCHER.
AUTOMATIC COMPUTING AND REGISTERING SCALE.
APPLICATION FILED FEB. 19, 1915.
1,335,067.
Patented Mar. 30, 1920.
13 SHEETS—SHEET 8.
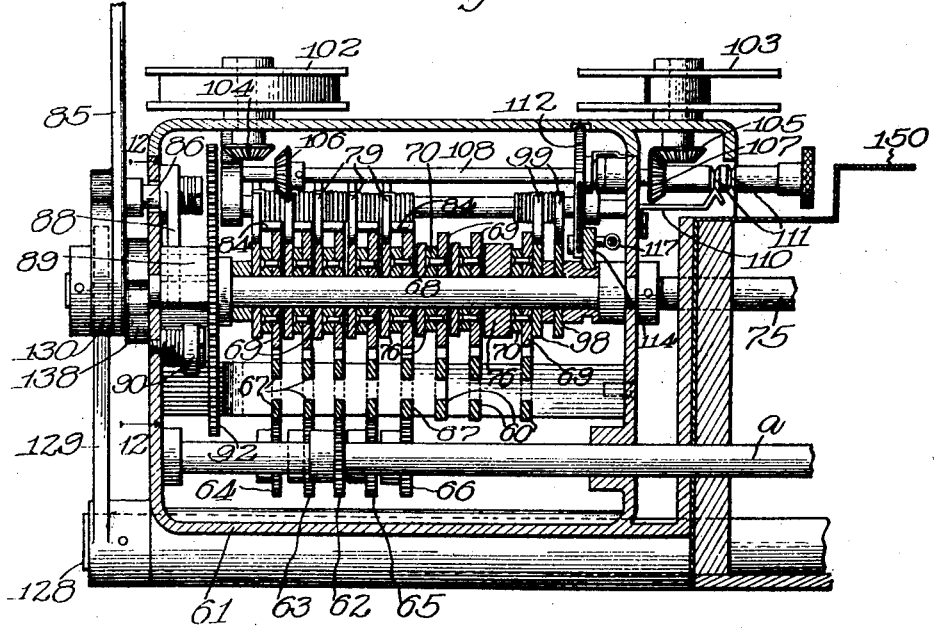

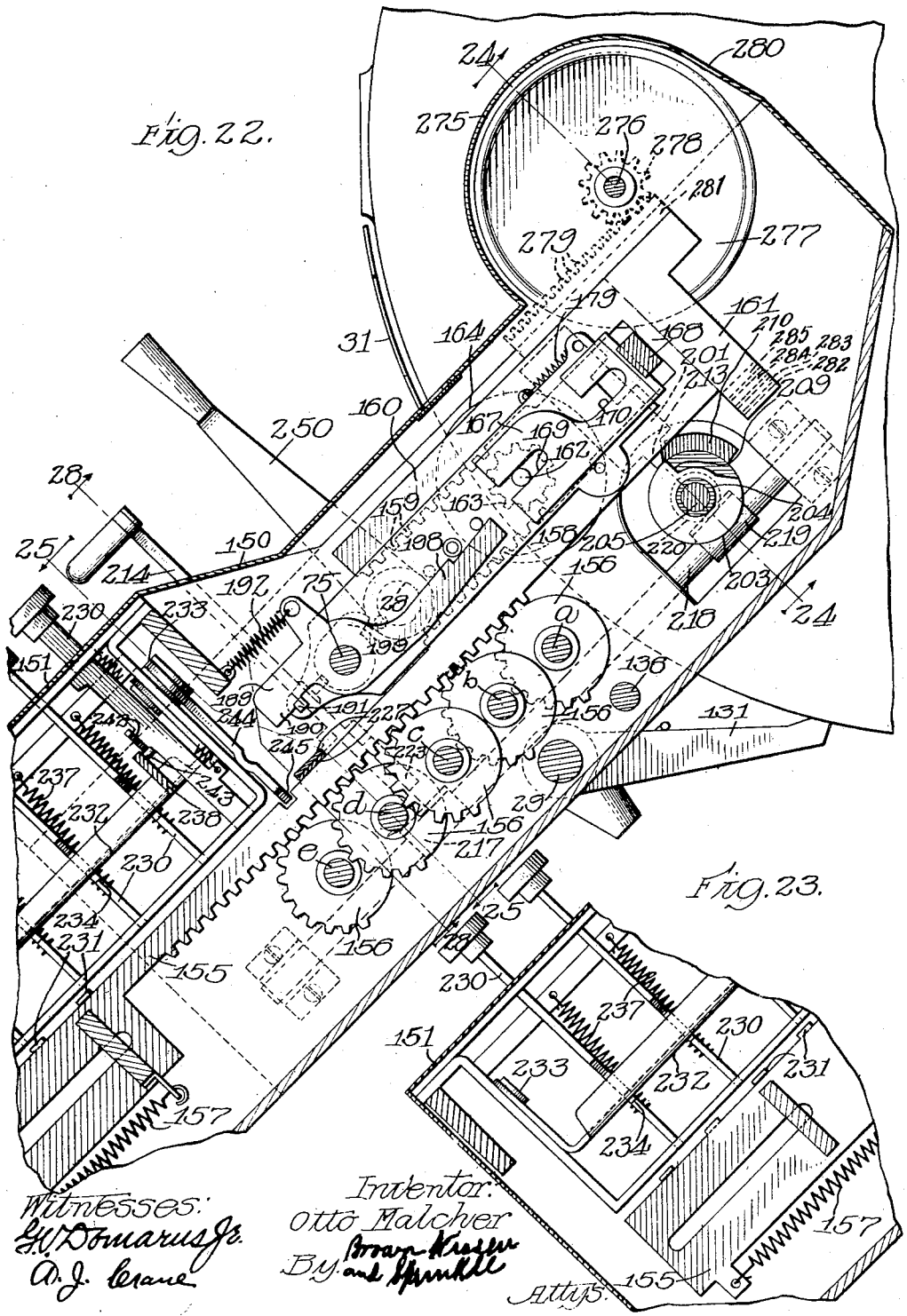

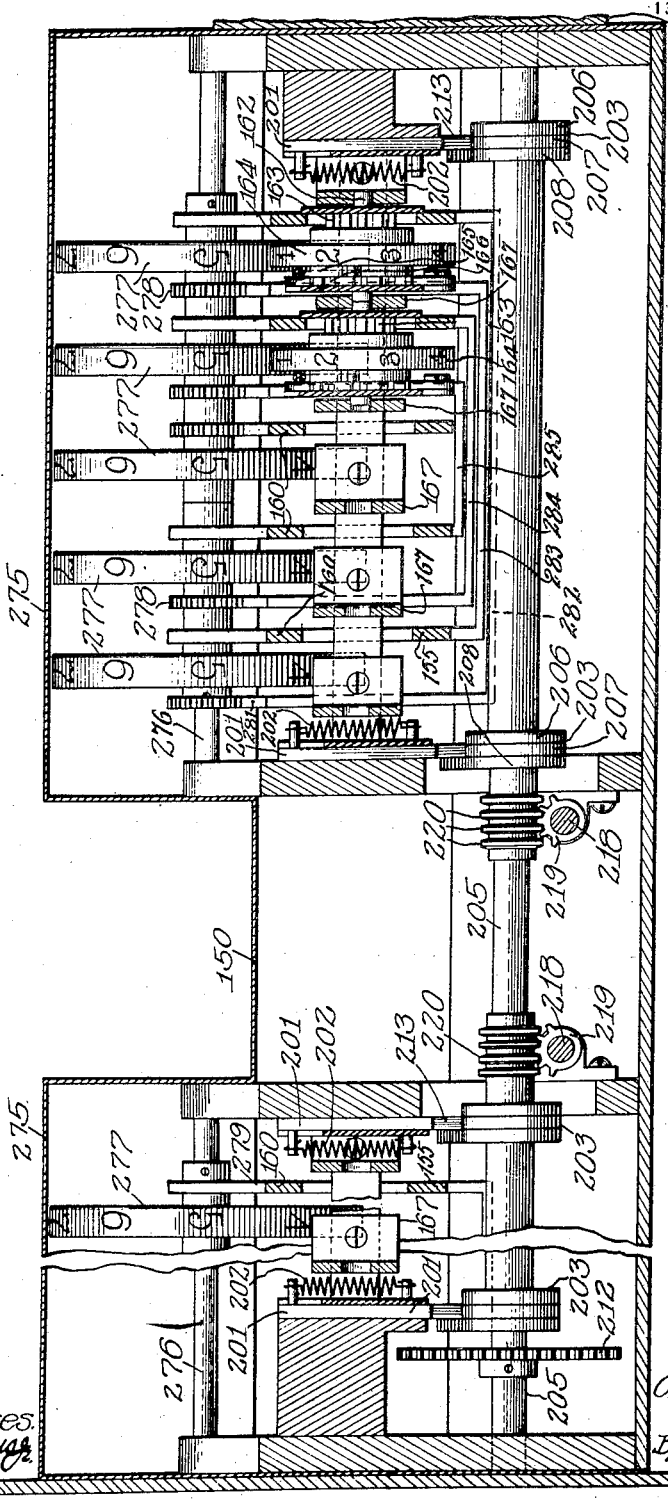

O. MALCHER.
AUTOMATIC COMPUTING AND REGISTERING SCALE.
APPLICATION FILED FEB. 19, 1915.
1,335,067.
Patented Mar. 30, 1920.
13 SHEETS—SHEET 11.
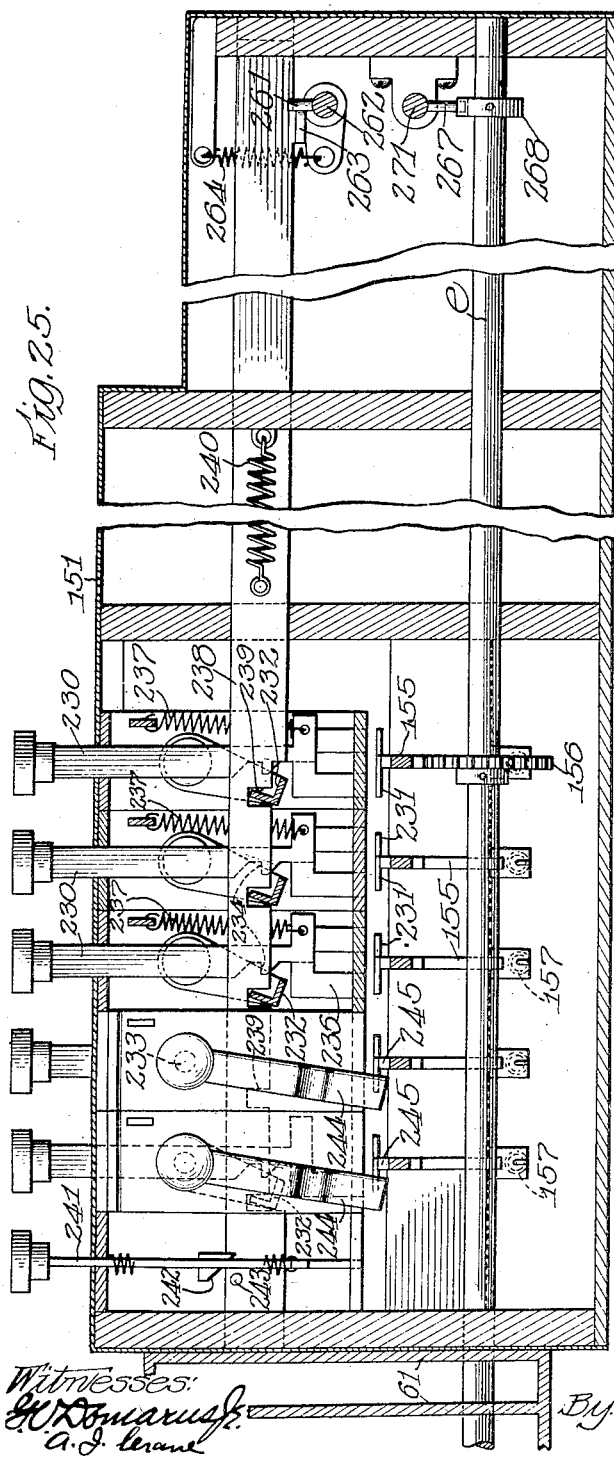
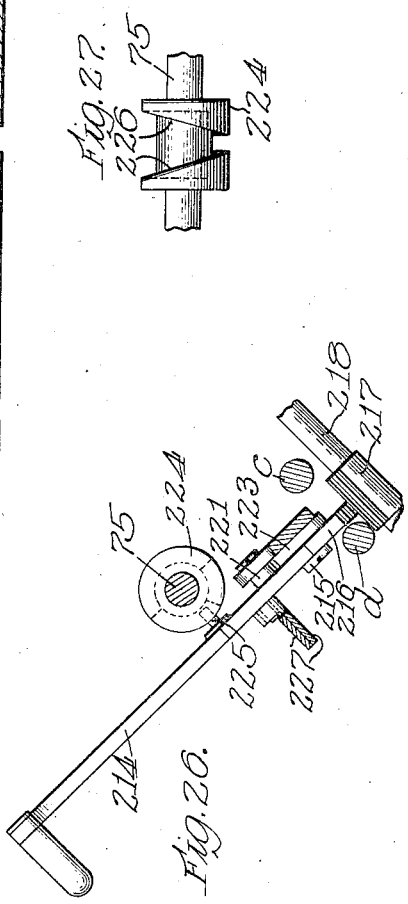

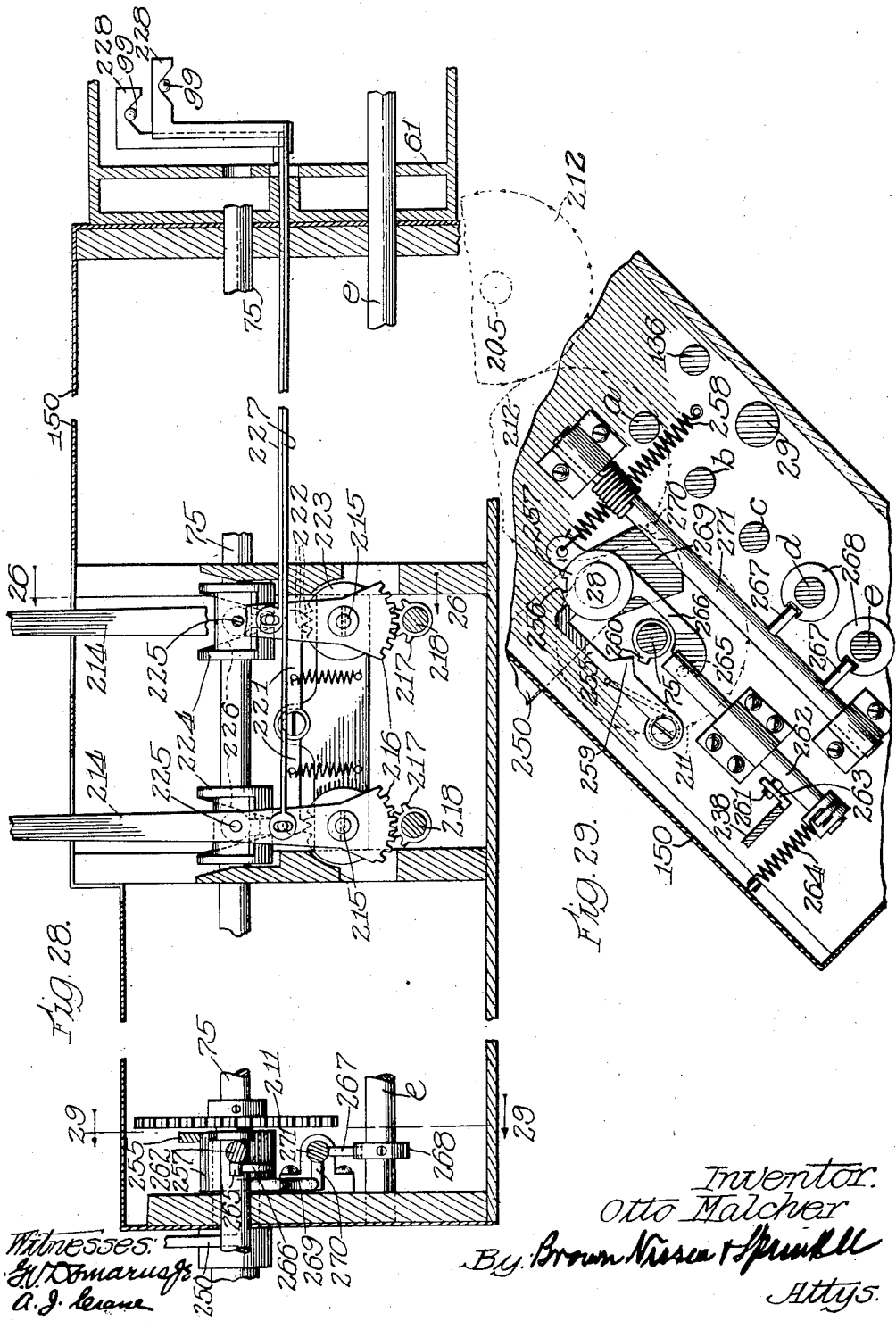

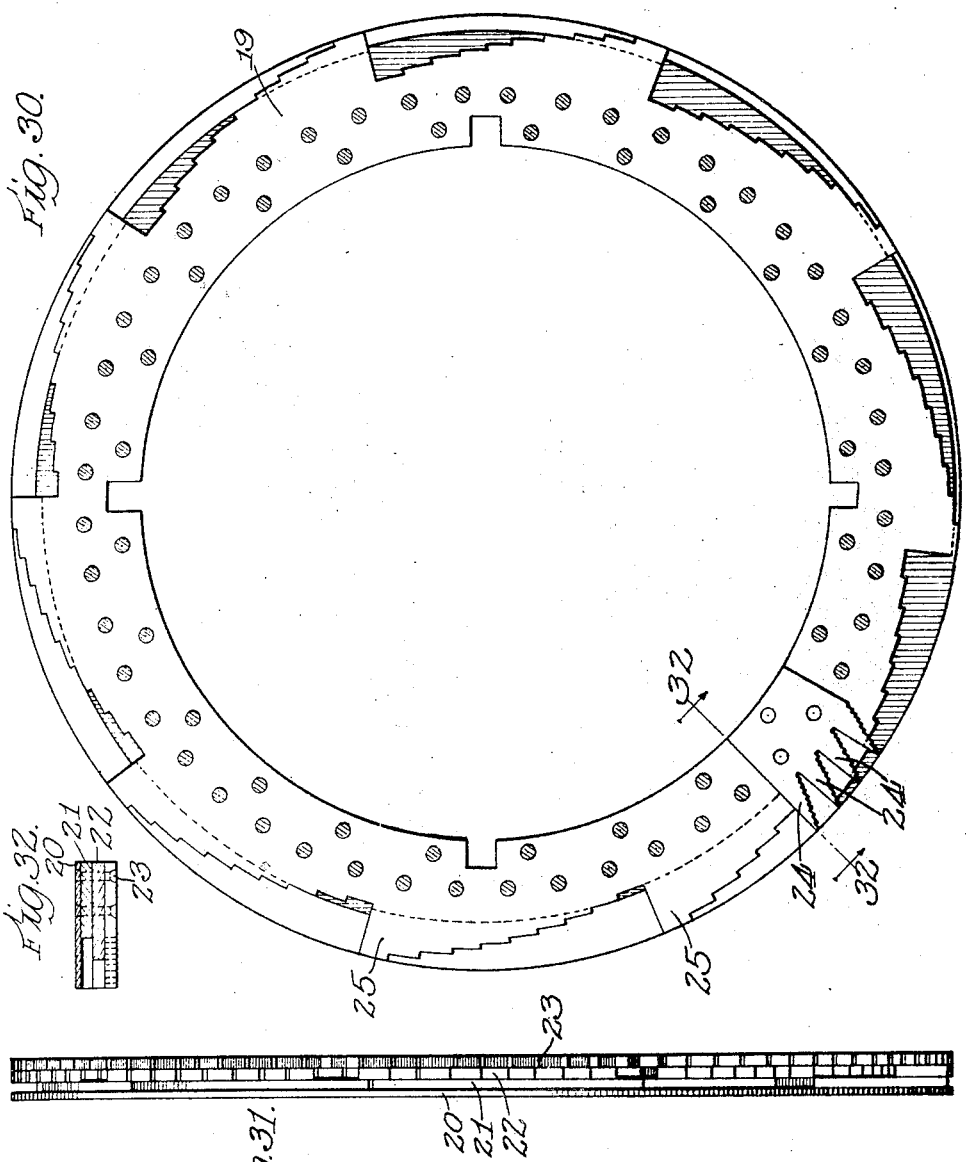

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

AUTOMATIC COMPUTING AND REGISTERING SCALE.

1,335,067.  Specification of Letters Patent.  Patented Mar. 30, 1920.

Application filed February 19, 1915. Serial No. 9,230.

*To all whom it may concern:*

Be it known that I, OTTO MALCHER, a citizen of the United States, residing at Chicago, in the county of Cook and State of Illinois, have invented certain new and useful Improvements in Automatic Computing and Registering Scales, of which the following is a specification.

This invention relates to computing scales such as are used in retail stores and similar places, and is an improvement of the device shown in my application Serial No. 2,882. The invention consists substantially in the combination and arrangement hereinafter described, illustrated in the accompanying drawings, and more particularly set forth in the appended claims.

In the drawings—

Fig. 2 is a fragmentary front elevation, partly in section, of a portion of the scale shown in Fig. 1, showing the computing drum and coöperating parts.

Fig. 3 is a front elevation of the portion of the device shown in Fig. 2.

Fig. 4 is a vertical section on line 4—4 of Fig. 2.

Fig. 5 is a section on line 5—5 of Fig. 4.

Fig. 6 is a section on line 6—6 of Fig. 4.

Fig. 7 is a perspective of one of the slides shown in Fig. 4.

Fig. 9 is a vertical sectional view on line 9—9 of Fig. 8.

Fig. 10 is a detailed perspective of a printing hammer locking dog.

Fig. 11 is a vertical sectional view showing one of the mutilated gears for operating a printing segment.

Fig. 12 is a section on line 12—12 of Fig. 17.

Fig. 13 is a sectional view on line 13—13 of Fig. 8, showing the operating mechanism for the platen.

Fig. 14 is a sectional view on line 14—14 of Fig. 9.

Fig. 15 is a vertical sectional view on line 15—15 of Fig. 3.

Fig. 16 is a vertical sectional view on line 16—16 of Fig. 2 showing the operating rack for the scale drum.

Fig. 17 is a sectional view on line 17—17 of Fig. 15.

Fig. 18 is a detail perspective of a locking lever for a part of the printing mechanism.

Fig. 19 is a detail sectional view on line 19—19 of Fig. 8 showing one of the totalizer units and the locking mechanism connected therewith.

Fig. 20 is a detail perspective of a printing hammer.

Fig. 21 is a view of a card or ticket such as is printed by this invention.

Fig. 22 is a fragmentary section on line 22—22 of Fig. 3.

Fig. 23 is a fragmentary section on line 23—23 of Fig. 3.

Fig. 24 is a section on line 24—24 of Fig. 22.

Fig. 25 is a section on line 25—25 of Fig. 22.

Fig. 26 is a fragmentary section on line 26—26 of Fig. 28.

Fig. 27 is a front elevation of a cam for controlling the operation of the lever shown in Fig. 26.

Fig. 28 is a fragmentary section on line 28—28 of Fig. 22.

Fig. 29 is a fragmentary section on line 29—29 of Fig. 28.

Fig. 30 is a vertical sectional view of the drum showing the stop rings.

Fig. 31 is an elevation of a drum unit shown in Fig. 30.

Fig. 32 is a section on line 32—32 of Fig. 30.

Figure 1:
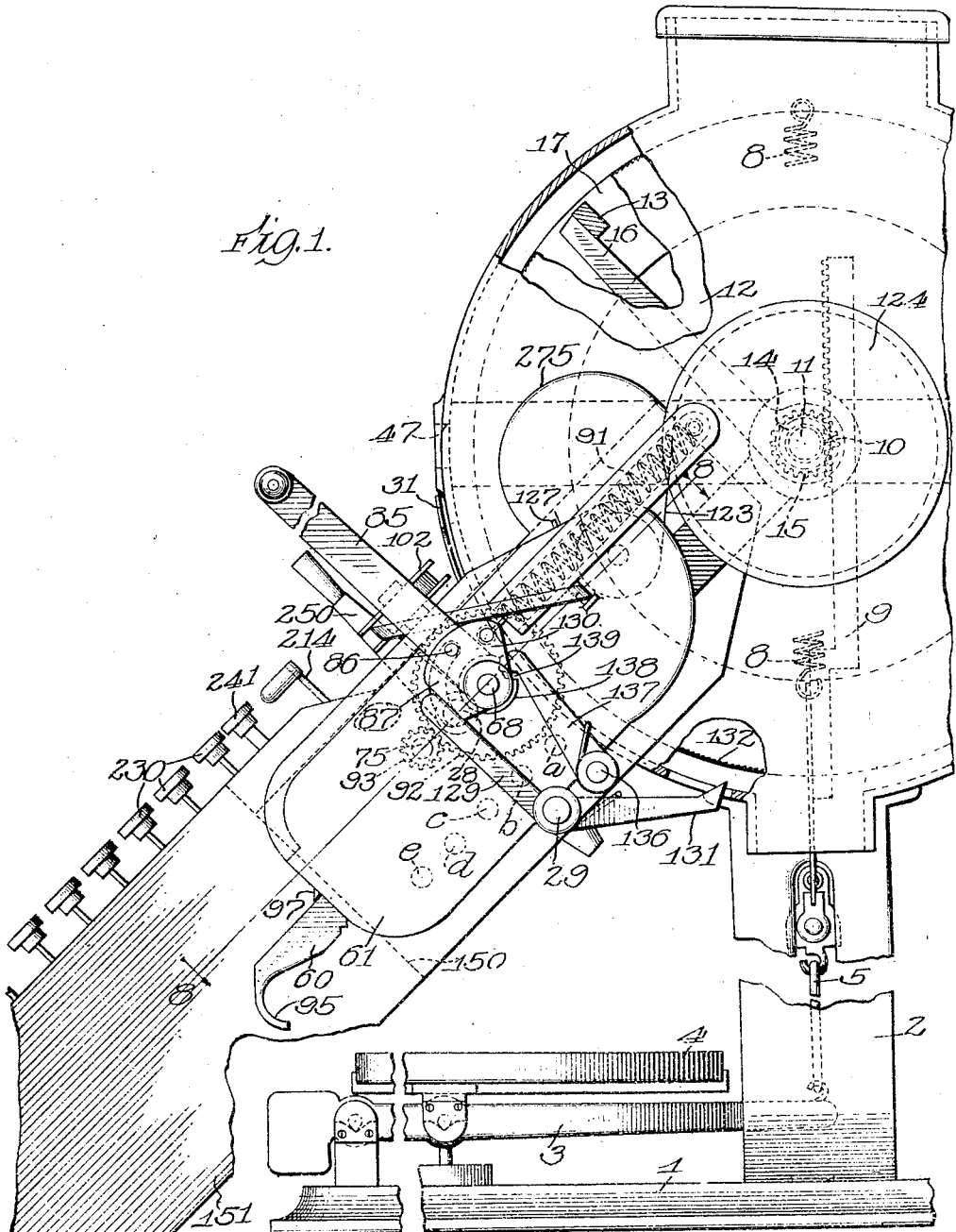
Figure 1 is a fragmentary end elevation of a scale embodying the present invention.

This invention includes a computing scale which comprises the usual scale pan and lever mechanism and a drum arranged to be controlled by the weight of an article on the scale pan. The drum carries a series of graduated units corresponding to different prices and an index device slidably mounted to coöperate with the different graduated units, and is operatively connected with a recording or printing device to record the values of articles placed upon the scale pan. The invention also comprises a number of totalizers adapted to be controlled by the index member. One totalizer is provided for each clerk or person who will use the scale, and each totalizer at the end of a given period will show the total of all the sales made by the clerk to whom said totalizer is assigned. A key-board is also provided upon which values of articles not to be weighed upon the scale are set up and are inserted in the total of sales of the particular clerk to whose credit the sale is to be ascribed. The invention also comprises an indicator for showing to the customer the price per pound that he is being charged for the article weighed upon the scale, and also for exhibiting to him the total price. The total price is also printed upon a ticket, together with the date and the character designating the person who made the sale. This ticket will ordinarily be handed to the customer, who will present it to the cashier when he pays for the article purchased.

In the drawing, the numeral 1 designates a base carrying uprights 2 upon which the computing scale is mounted. A scale beam 3 and a scale pan 4 are carried by the base 1 and the scale beam is connected to a rod 5 which in turn connects with two cross-bars 6 and 7, Figs. 1 and 2. The cross-bar 6 is supported at opposite ends by springs 8 which counter-balance the weight of an article on the scale pan and yield an amount proportional to the weight of such article in the way usual in such devices. The ends of the rod 7 carry racks 9 which mesh with pinions 10 on each end of the shaft 11. Carried by the shaft 11 to rotate therewith, are disks 12, each disk carrying a stop member 13. It will be seen that when an article is placed upon the scale pan the disk 12 will be rotated a distance proportional to the weight of such article. Coaxial with the shaft 11 and surrounding it, is a hollow shaft 14 mounted to rotate independently of the shaft 11. Secured to the shaft 14 to rotate therewith, are pinions 15 and arms 16. Also carried by the shaft 14 is a drum 17 mounted upon a spider 18. The drum 17 is composed of a plurality of graduated units one of which is shown more clearly in Figs. 30, 31 and 32. Each of these units consists of four metallic rings 20, 21, 22 and 23. The ring 20 is of uniform width and constitutes a support for the other three rings. One unit is provided for each of the prices per pound of articles the value of which the scale is adapted to compute. In the device as shown in Fig. 2, graduated units corresponding to prices from eight to forty cents per pound are shown. It is evident that the capacity of the scale may be varied to suit any particular trade. The unit shown in Figs. 30 to 32 is the unit used in computing values of articles at forty cents per pound. In this unit, as in all other units, the ring 23 corresponds to the unit decimal order of the value to be computed, and is used to ascertain the digit in the value of the article which stands in the cents column. The ring 22 is used to ascertain the digit which stands in the tens column and the ring 21 ascertains the digit which stands in the hundreds or dollar column. The ring 23 has a plurality of stop members 24 extending around the drum. In Fig. 30, only four of such stop members are shown but it is understood that they extend entirely around the ring. Each of the stop members 24 carries ten stops and each of the stops is of a width corresponding to the movement of the drum caused by the weight of an article whose value is one cent at the particular price which the graduated unit represents. The ring 22 also carries a plurality of stop members 25 extending around the drum, and each of the stop members 25 is provided with ten stops, each of which is of a width corresponding to the movement of the drum caused by the weight of an article whose value is ten cents. It will be evident that there will be one stop on the ring 22 for each ten stops on the ring 23. The ring 21 carries a plurality of stops each of which corresponds to the movement of the drum caused by the weight of an article the value of which is one dollar. All of the units 19 are arranged upon the spider 18 and constitute a drum adapted to be rotated, in a manner to be described, an amount limited by the stops 13 on the disks 12. Since the stops 13 are moved by the weight of an article upon the scale pan a distance proportional to the weight, it will be evident that the drum will be permitted to move a corresponding distance before it is stopped by the arm 16 contacting with the stop members 13. In other words, means is provided for limiting the rotation of the drum to an amount proportional to the weight of an article upon the scale pan.

Carried by the spider 18 are a plurality of screw rods 26 carrying adjustable weights 27 for adjusting the center of gravity of drum 19 to coincide with the axis of rotation thereof. Slidably mounted on shafts 28 and 29, which extend longitudinally of the drum, is an index member 30 (Figs. 2, 4, 5, 6, and 7). This index member carries a pointer 31 coöperating with a series of numerals 32 upon the face of the casing surrounding the drum, to indicate the price at which the scale calculates the value of an article upon the pan. A price number is provided for each of the drum units and the shaft 29 is provided with a plurality of cross grooves 33 with which coöperates a detent 34 to accurately locate the index device to coöperate with the proper drum unit. The index device carries a plurality of slides 35, 36 and 37, one for each of the stop rings on the drum unit with which it is set to coöperate. A slot 38 is cut in the casing surrounding the scale drum, through which the slides 35, 36 and 37 are projected to coöperate with the stop rings. It will now be apparent that when the index member 30 is set opposite a graduated unit of the drum and the drum rotated a distance corresponding to the weight of an article upon the scale pan, the number of stops on the ring 23 that will have passed the zero position, that is the position occupied by the slide 35, will be equal to the value of the article in cents, computed at the price to which the particular drum unit corresponds. It will be understood that the outmost stop on the ring corresponds to the zero position of the slide coöperating therewith, and since each tenth stop is in this zero position, it will be evident that when a number of stops equal to the value of the article have passed the zero position the slide will stand opposite the stop corresponding to the digit in the units column of the number representing the value of the article, and if the slide is projected forwardly until it is arrested by the stop, it will be moved a distance proportional to the digit in the units column of that number. In like manner, the stop 36 will move a distance proportional to the digit in the tens column and the stop 37 a distance proportional to the digit in the hundreds column of the number representing the value of the article upon the scale pan at the price to which the drum unit with which the stops coöperate corresponds.

Carried by the index member 31, is a lug 40, and connected to the lug 40 is a band 42 extending entirely across the front of the drum and supported by rollers 43 (Fig. 4). At each end of the drum the band 42 extends through to the opposite side and returns along the drum at the side opposite the index member 31 in a position corresponding to that on the side next to the index member 31. A lug 44 is attached to the band 42 in a position corresponding to the lug 40 but on the opposite side of the drum, and an index finger 45 is attached to the lug 44 and is adapted to travel lengthwise of the drum casing simultaneously with the movement of the finger 31, but in an opposite direction. A series of figures similar to figures 32 shown in Fig. 2, is arranged on the drum casing opposite the figures 32 but in reverse order thereto. It will be evident that when the finger 31 is moved to indicate a given price, the finger 45 will correspondingly move to indicate the same price on the opposite side of the drum. It will thus be apparent that the finger 45 will indicate to the customer the price at which the scale is being set at the same time that the finger 31 indicates the price to the salesman. A section 46 is provided near the center of the drum upon which a scale of pounds and ounces is arranged. Openings 47 and 48 are provided on opposite sides of the drum casing to permit the salesman and the customer to read the weight of the article upon the scale pan in pounds if they so desire.

A series of shafts, $a$, $b$, and $c$ extend longitudinally of the device, and slidably mounted on these shafts within the index member 30, are a series of pinions 50, 51 and 52, meshing respectively with the slides 37, 36 and 35. It will be apparent that the rotation of the shafts $a$, $b$ and $c$ will therefore be controlled by the movement of the slides 37, 36 and 35 respectively.

A printing device shown in Figs. 8, 9, 15 and 17 is provided the operation of which is controlled by the shafts $a$, $b$ and $c$ and by similar shafts $d$ and $e$, and by adjustable slides 60. The casing 61, (Fig. 3) is supported at the right hand end of the computing scale and the shafts $a$, $b$, $c$, $d$ and $e$ extend through the casing, and each carries a pinion 62, 63, 64, 65 and 66 respectively within the casing 61. Sliding racks 67 are mounted within the casing, one for each of these pinions (see particularly Figs. 8, 9 and 17). Carried on a shaft 68 which extends through the casing 61 are a plurality of mutilated gears 69 (Figs. 9, 11 and 17). Secured to each of the mutilated gears 69 is a type segment 70, each of which type segments carries a plurality of type bars 71 mounted to slide in the segments 70. The type bars 71 are normally held in retracted position by springs 72 (Figs. 9 and 14). It will now be apparent that when one of the shafts $a$, $b$, $c$, $d$ or $e$ is rotated, the corresponding type segment 70 will also be moved a distance proportional to the amount of rotation of the shaft. The movement of the type segments 70 will bring the type bars 71 successively into printing position and each of the type segments 70 carries numerals ranging from zero to nine. It will thus be seen that if the shaft $a$, for instance, is permitted by the slide 37 to move a distance corresponding to a particular number of stops on the scale drum, the type segment 70 corresponding thereto will be moved a distance to bring a corresponding number into printing position.

Each of the racks 67 is provided with a spring 73 which normally tends to move the rack forwardly to rotate the printing segment upwardly and force the slides in the index member 30 into contact with the stops on the scale drum. The racks 67 are normally held in retracted position against the tension of the spring 73 and the slides in the index member 30 are held out of contact with the drum by means of cams 74 carried by the shaft 75. Mounted to slide on the shafts 68 and 75 (Figs. 8, 9, 15 and 20), are a plurality of type hammers 76 one for each of the type segments 70. These type hammers 76 are resiliently drawn forwardly by spring 77 and are normally held in retracted position by cams 78 mounted on the shaft 75 to rotate therewith. A detent 79 is provided for each of said type hammers 76 and coöperates with the projection 80 thereon to hold the type hammer in retracted position (Figs. 9 and 10). Each of the detents 79 carries a lateral projection 82 adapted to contact with the next adjacent detent. The mutilated gears 69 carry cam projections 83 (Figs. 9 and 11) adapted to coöperate with pins 84 carried by the detents 79. It will be apparent that when one of the racks 67 moves forwardly and rotates the mutilated gear 69 to set the cam segment 70, the detent 79 will be freed from the projection 80 and the type hammer 76 will be free to move forwardly to strike a type bar and print a numeral when it is released by rotation of the cam 78 on the shaft 75. If, during any operation any one of the racks 67 is not permitted to move, the corresponding detent 79 will not be released and the type hammer will be held in retracted position and no number will be printed in the decimal order corresponding to the rack which is not moved, unless a rack corresponding to a higher decimal order has been moved. In case a rack corresponding to a higher decimal order has been moved, the projection 82 will release the detent of the lower decimal order and the type hammer will move forwardly and print a zero in the decimal order in which no movement of the rack 67 has taken place.

Mechanism for rotating the shafts 68 and 75 is provided as follows, attention being called especially to Figs. 1, 3, 8, 12 and 17. Rotatably mounted on the shaft 68 is a hand crank 85 having a projection 86 extending through a slot 87 in the casing 61. The projection 86 carries a dog 88 within the casing 61. The shaft 68 has a ratchet member 89 rigidly mounted thereon and with which the dog 88 is adapted to coöperate to rotate the shaft 68. A pawl 90 is secured to the casing 61 to prevent backward movement of the ratchet member 89. A spring 91 is attached to the hand crank 85 and normally tends to draw it to the right as viewed in Fig. 1. The amount of movement of the hand crank 85 is limited to a quarter revolution by the slot 87. A gear 92 is secured to the shaft 68 to rotate therewith, and a pinion 93 meshing with the gear 92 is secured to the shaft 75 to rotate therewith. The ratio of the gears 92 and 93 is such that a quarter turn of the gear 92 will cause a complete revolution of the gear 93. It will be apparent that when the hand crank 85 is drawn forwardly or to the left in Fig. 1, no motion of the shafts 68 and 75 will take place, but on the return stroke of the hand crank 85 under the influence of the spring 91, the dog 88 will cause the shaft 68 to rotate a quarter revolution and simultaneously the shaft 75 will be given a complete rotation.

Figure 8:
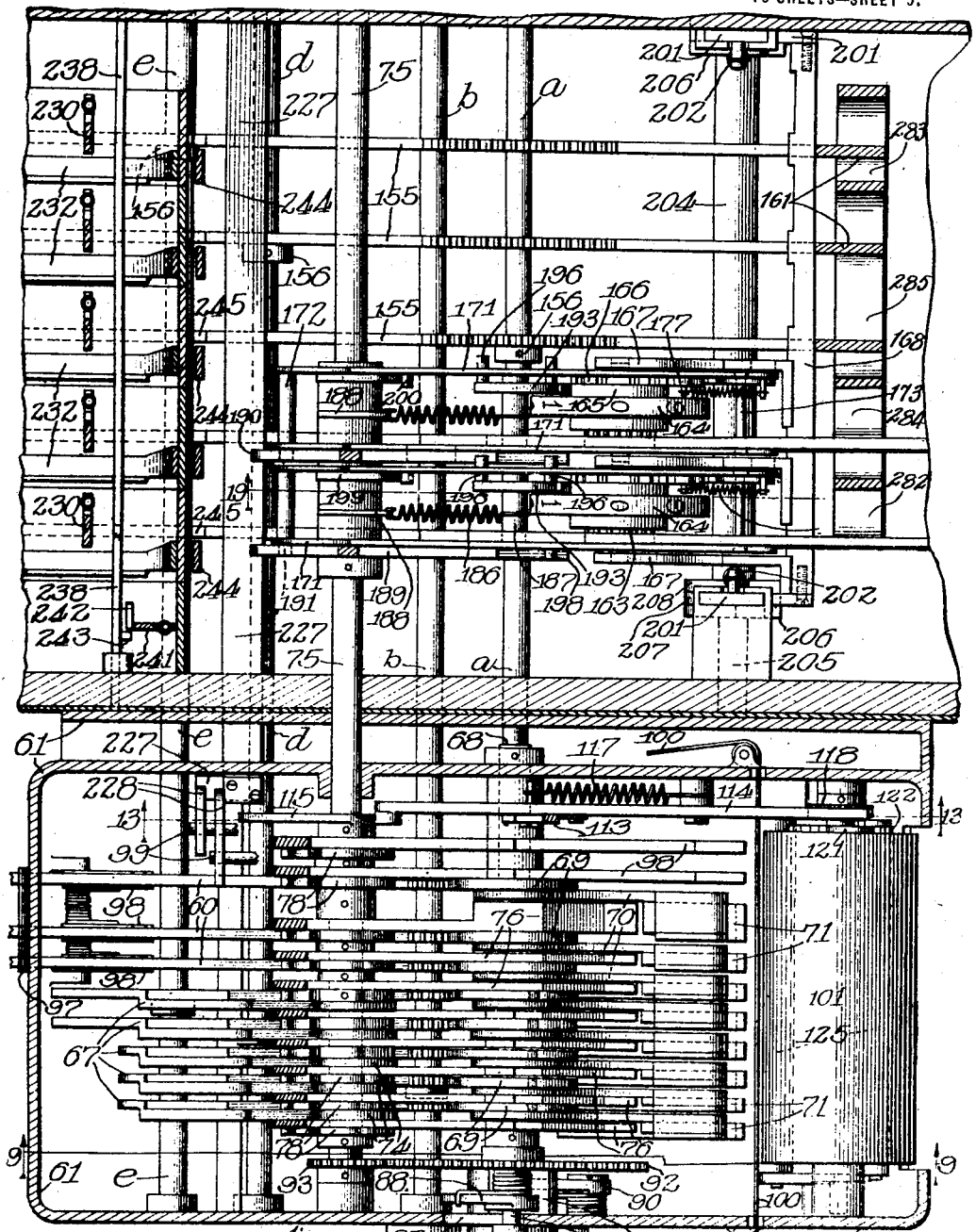
Fig. 8 is a sectional view on line 8—8 of Fig. 1.

In addition to the printing segments controlled by the shafts $a$, $b$, $c$, $d$ and $e$, three other printing segments are controlled by the hand operated racks 60 (Figs. 8 and 15). These racks coöperate with mutilated gears and printing segments in the same way as the racks controlled by the shafts, but are operated by finger holds 95. The position of the racks 60 is indicated by scales 96 on top of the racks and pointers 97 on the casing 61. The racks 60 are held in their adjusted position by spring pawls 98. The printing segments controlled by the racks 60 carry type members adapted to print dates. One of the printing segments carries abbreviations of the twelve months of the year; another carries figures from one to three to represent the digits in the tens place of the various days of a month, and the other carries digits from zero to nine to represent the figures in the units place of the days of the month. It will be seen by properly setting the racks 60, any date in the year may be printed simultaneously with the printing of the values of the article weighed on the scale.

In addition to the type segments, the printing mechanism contains two printing bars 98, Fig. 8. These printing bars are of the same general shape as the type hammers previously described, but instead of coöperating with type bars carried by printing segments, they are long enough to contact directly with the printing ribbon. The printing slides or bars 98 are operated in the same way as the type hammers except that instead of a dog 79 they are provided with a trip lever 99, Figs. 15 and 18. Each of these printing bars is provided with a designating character such as the letters A and B, and although but two are shown in the drawing, any number of these printing bars may be provided, the object being to provide one for each of the salesmen who is assigned to one scale. When a particular salesman is operating the scale, he first releases the trip lever 99 corresponding to his individual characteristic letter, so that simultaneously with the printing of the sale which he makes, his characteristic letter will be printed upon the ticket. The mechanism for releasing the trip levers 99 will be more fully explained later. In line with the printing position of the type, is a ribbon 100 and a platen 101. The ribbon is carried on spools 102 and 103 mounted on the casing 61 (Fig. 17). The spools 102 and 103 carry bevel gears 104 and 105 respectively adapted to coöperate with bevel gears 106 and 107 on the shaft 108 which is adapted to be slid longitudinally within the casing 61 to alternately bring the gears 104 and 105 into operative relation with the shaft. A spring detent 110 coöperates with notches 111 in the shaft 108 to hold it in its adjusted positions. The direction in which the ribbon will be fed by the rotation of the shaft 108 will depend upon the position of adjustment of the shaft 108, and this may be changed to alternately feed the ribbon from one spool to the other. The shaft 108 carries a ratchet wheel 112 (Figs. 13, 15 and 17). This ratchet wheel is rotated by the spring pawl 113 carried by the sliding rack bar 114 which is in turn reciprocated by a cam 115 carried on shaft 75. A spring pawl 116 prevents a backward movement of the ratchet 112. Spring 117 normally holds the sliding rack bar 114 in retracted position against the cam 115. It will be apparent that for each revolution of the shaft 75 caused by the movement of the hand crank 85, the ribbon will be fed a slight distance. The sliding rack bar 114 at the same time rotates the platen 101 to feed the paper forwardly. The bar 114 coöperates with a pinion 118 secured to the shaft 119 upon which the platen 101 is free to rotate (Figs. 8, 13 and 15). Secured to the shaft 119 is an arm 120 carrying a pawl 121 adapted to coöperate with ratchet teeth 122 carried by the platen 101. It will be apparent that for each reciprocation of the bar 114 the platen 101 will be given a part of a revolution in the direction to feed the paper 123 carried by the roll 124 forwardly. Guide rolls 125 and 126 hold the paper in contact with the platen 101 and a knife ege 127 is provided against which the portion of the paper fed forwardly may be torn off. The cam 115 is so positioned on the shaft 75 that the feeding of the paper and the moving of the type ribbon takes place after the other operations of the printing mechanism, so that when the paper is fed forwardly, the number set up in the printing mechanism will have previously been printed thereon.

Mounted in the casing 61 near the bottom thereof, is a shaft 29 (see particularly Figs. 1, 15 and 17), and secured to this shaft is an arm 129 adapted to coöperate with a cam 130 carried by the hand crank 85. Secured to the shaft 129 are two detents 131 (Figs. 1, 2 and 15). The detents 131 are adapted to coöperate with ratchet teeth 132 carried on the periphery of the disks 12. From the shape of the cam 130 it will be apparent that the first effect of the forward movement of the hand crank 85 will be to force the detents 131 into contact with the ratchet teeth 132 and thus hold the disks 12 firmly in position to check the movement of the drum, which is effected in a manner which will now be described, reference being had particularly to Figs. 1, 2 and 16. Meshing with the pinion 15 on the shaft 14, is a sliding rack bar 133 normally held in the position shown in Fig. 16 against the tension of the spring 134, by the detent 135 carried on the shaft 136. Referring to Fig. 1, it will be seen that the shaft 136 has an arm 137 secured thereto, and the end of the arm 137 coöperates with a cam 138 secured to the shaft 68. A notch 139 in the cam 138 is of sufficient width to permit a slight rotation of the shaft 68 before the cam coöperates with the arm 137 to rock the shaft 136. When the shaft 136 is rocked by the cam 138, the detent 135 will be moved out of contact with the notch in the rack 133 and the rack will be drawn to the left in Fig. 16 to rotate the pinion 15 and the scale drum. Two racks 133 are provided, one at each end of the drum to coöperate with the two pinions 15, and mounted on the shaft 75 in position to coöperate with the racks 133 are mutilated gears 140 (Figs. 2 and 16). These mutilated gears are arranged to mesh with the teeth 141 on the rack 133 and return the rack to its original position during the latter part of the rotation of the shaft 75, and after the operation of the printing mechanism.

It is thought that the operation of the device thus far described will now be apparent. The operator will place an article to be weighed upon the scale pan and the weight of the article will cause the disks 12 to rotate a distance proportional to the weight. The operator then adjusts the index member 30 to a position corresponding to the price of the article upon the scale pan. He then releases the trip lever 99, by mechanism not yet described, to free the printing slide 98 corresponding to his designating character, the type segments carrying the date type having been previously set for the date upon which the transaction is made. The date segments are set once each day and are allowed to remain so throughout the entire day. The operator now moves the hand crank 85 forwardly or to the left, as viewed in Fig. 1, and allows it to return under the influence of the spring 91. The first effect of the forward movement of the hand crank 85 will be to force the detents 131 into contact with the teeth 132 and hold the disks 12 in the position to which they have been moved by the article upon the scale pan. Immediately after the detents 131 have thus been set, the shaft 136 will be rotated by the cam 138 and the racks 133 will be moved by the springs 134 to rotate the scale drum until it is stopped by the projections 13 on the disks 12. During the movement of the parts thus far described, the slides 50, 51 and 52 have been held out of contact with the drum because the shafts $a$, $b$ and $c$ have been held from rotation by means of the cams 74 and the racks 67. As soon as the hand crank 85 starts on its return movement, however, the cams 74 will move out of contact with the projections 142 on the racks 67. This will free the racks 67 and allow them to move under the influence of the spring 73, the amount of movement being determined by the distance the slides 50, 51 and 52 are permitted to move before they contact with the scale drum. The type segments are rotated by the racks 67 a distance proportional to the corresponding movements of the slides 50, 51 and 52. During the movement of these segments, the cams 69 release the detents 79 corresponding with the segments moved and free the type hammers 76 from the influence of these detents. If there is no movement in any particular slide the type hammer for that decimal order will not be released unless there has been a movement of a slide of a higher decimal order, in which case all of the type hammers of a lower decimal order will be released in the manner previously described. After the movement of the racks thus described has taken place, the next effect of the return movement of the hand crank 85 will be to release the type hammers from the cams 78 and permit them to move forwardly under the influence of the springs 70 to print the number set up in the printing mechanism. Further movement of the hand crank 85 will complete the revolution of the shaft 75 and return the racks 67 and the hammers 78 to their original position. The last part of the rotation of the shaft 75 will also operate the slide 114 by means of the cam 115 to shift the printing ribbon and to move the part of the paper that has received the impression, past the knife edge 127. The last effect of the rotation of the shaft 75 will be to cause the mutilated gears 140 to contact with the teeth 141 and return the rack 133 and the scale drum to their original position.

In addition to printing the amount of the sale made by a salesman, together with a designation character showing by whom the sale was made, it is desirable to know at the close of the day the total amount of the sales made by each salesman. It is also desirable to be able to enter in the totals not only the sales of articles which are weighed upon the scale, but also sales of other articles which are not sold by weight. The present invention includes mechanism for accomplishing these results, which will now be described. Mounted upon the right of the computing scale, as viewed in Figs. 2 and 3, are a plurality of totalizers designated generally by the reference numeral 150 and a key-board 151; the particular totalizer and key-board used in this connection may be varied, but I prefer the form shown in my copending application, Serial No. 888. The construction of this totalizer will be best understood by reference to Figs. 8, 19, 22, 23, 24 and 25. It will be seen from Fig. 22 that shafts $a$, $b$, $c$, $d$ and $e$ extend through the totalizer casing. The shafts $a$, $b$ and $c$, as has been previously described, continue, after passing through the totalizer casing, to coöperate with the scale drum through the index member 30. The shafts $d$ and $e$ extend only through the totalizers. A series of sliding racks 155, one for each of the shafts $a$, $b$, $c$, $d$ and $e$, are provided in each totalizer and each of these racks coöperates with a pinion 156 carried on one of the shafts $a$, $b$, $c$, $d$ or $e$. A spring 157 (Figs. 22 and 23) normally tends to force the racks 155 to the right as viewed in Fig. 22. The racks are held in retracted position against the influence of the springs 157 by the gears 156, and when the shafts $a$, $b$, $c$, $d$ and $e$ are freed to rotate by the movement of the hand crank 85 in the manner previously described, the racks 155 will be moved to the right as viewed in Fig. 22. It will thus be seen that during a computing operation of the scale, three of the racks 155, those controlled by the shafts $a$, $b$ and $c$, will be moved forwardly a distance proportional to the movement of the slides 50, 51 and 52. During the operation of the scale, mechanism is provided for holding the shafts $d$ and $e$ from rotation. This mechanism will be described later. The ends of the racks shown at the right of Fig. 22, carry two sets of rack teeth 158 and 159. The teeth 159 are carried on a projection 160 extending to the left from an upstanding portion 161 secured to the end of the rack 155. A series of totalizer units, one for each of the racks 155, is mounted in each of the totalizers 150. Each totalizer unit, Fig. 24, comprises a shaft 162, a pinion 163, a number wheel 164, a one-toothed gear 165, and a star gear 166. These parts are all secured together to rotate in unison. The ends of the shafts are journaled in bearing members 167 (Figs. 8, 22 and 24). These bearing members are carried on a vertically movable bar 168 and means to be described is provided for shifting this bar to bring the pinions 163 into contact with the teeth 158 or 159 as the operator may desire. As shown in Figs. 19 and 22, the bearing members 167 are provided with slots 169 in which the ends of the shafts 162 are mounted to slide and rotate. Each of the bearing members 167 is also provided with a slot 170 for a purpose to be pointed out. As will appear more clearly from Fig. 8, each totalizer unit is provided with a pair of side plates 171, and these side plates are connected together at their ends by spacing members 172 and 173. Each pair of side plates and spacing members constitutes a rectangular frame pivotally mounted at one end upon the shaft 75, which extends through an elongated opening 176 (Fig. 19) in the side members 171. It will be apparent that the side members 171 are free to swing about the shaft 75 as an axis and are also free to move longitudinally of the side members on said shaft a distance proportional to the length of the slots 176.

The shafts 162 are journaled in the side members 171 to rotate therein but are constrained to move with the side members 171 when they are moved longitudinally or pivotally upon the shaft 75. It will be apparent that when the bar 168 is moved up and down to throw the pinion 163 in and out of contact with the teeth 158 and 159, the side bars 171 will be rotated slightly about the shaft 75. A locking member 177 (Fig. 19) is pivoted on the side bar 171 and has a projection 178 adapted to enter the notches in the star wheel 166. A spring 179 normally tends to hold the locking member 177 out of engagement with the star wheel. A detent 180 is pivoted on the side plate 171 and has a projection 181 adapted to coöperate with a projection 182 on the locking member 177 to hold the locking member in engagement with the star wheel to prevent rotation of the totalizer unit. The detent 180 is also provided with notches 183, one on each side of the projection 181. On the opposite side of the pivot from the projection 181, the detent 180 carries a laterally projecting lug 184 extending into one of the grooves 170 of the bearing member 167. When the bar 168 is moved vertically, either upwardly or downwardly from its central position, the lug 184 will move in unison therewith, being held in one of the slots 170. The totalizer shaft 162 will also move in unison with the bar 168, but the spacing member 173 on which the detent 180 is pivoted will move a greater distance than the lug 184, due to the fact that it is carried by the side plate 171 which moves about the shaft 75 as a pivot. The detent 180 will therefore be rotated about the spacing member 173 a distance sufficient to bring one of the notches 183 into position to receive the projection 182 on the locking member 177. When this occurs the spring 179 will withdraw the projection 178 from the star wheel 166 and leave the totalizer unit free to rotate about its axis. In this way the totalizer unit is locked from rotation when it is in central position, but is free to rotate when it is moved upwardly or downwardly into contact with the rack teeth 158 or 159. Means is provided for placing the totalizer units in operative connection with the rack teeth 158 or 159 during the movement of the racks to the right as viewed in Fig. 22, and for automatically restoring the totalizer unit to its intermediate position during the return movement of the racks. When the totalizer unit is in operative connection with the upper teeth 159, the totalizer will be rotated in adding direction, that is in the direction to bring successively higher numbers on the number wheels 164 into position beneath the openings 185 in the casing (Fig. 3). The numeral wheels are provided with figures ranging from zero to nine to correspond with the stops on the scale drum, and the type bars in the printing mechanism. Means is provided for carrying from one totalizer unit to the unit of the next higher decimal order, that is for rotating the unit of the higher decimal order a distance sufficient to add one unit for each revolution of the totalizer unit of the lower order. This is accomplished through the sliding movement of the side plates 171 on the shaft 175. Springs 186 (Fig. 8) are attached to spacing members 187 secured to the side members 171 and also at their other end to rings 188 passing around the shaft 75. These springs normally tend to draw the side members together with their totalizer units, to the left, as shown in Fig. 8. A locking lever 189 (Figs. 8 and 22) is pivoted on the shaft 75 and has a catch 190 adapted to engage a rectangular extension 191 of the spacing member 172. This locking member normally holds the side plates 171 in the position shown in Fig. 19 against the tension of the spring 186. A spring 192 holds the member 189 in locking position. A disk 193 is pivotally mounted on the spacing member 187 of each totalizer unit and each disk carries a projection 194 in position to coöperate with the tooth 195 of the one-toothed gear 165. Each disk 193 carries two lugs 196 (Figs. 8 and 19) extending through slots 197 in the side plates of the totalizer unit, and projecting through a sufficient distance to coöperate with the extension 198 (Fig. 22) of the locking lever 189 of the next higher decimal order. It will be apparent that for every revolution of a totalizer unit, the tooth 195 will pass the projection 194 and rock the disk 193, causing one of the lugs 196 to press downwardly on the extension 198 and free the catch member 190 from the rectangular extension 191 which holds the totalizer unit of the next higher decimal order, in position. The totalizer unit will thus be free to move under the influence of the spring 186 and since this movement will take place when the pinion 163 is in contact with the rack 155, the totalizer unit of the higher decimal order will be rotated by the pinion traveling along the rack. The slot 176 is made of the proper length to cause the totalizer unit to be thus rotated a distance to add one digit to the totalizer unit thus rotated. In this way one digit is added to the next higher decimal order for each revolution of the totalizer unit. It may at times be desirable to operate the totalizer in a subtracting instead of an adding direction. It will be apparent that this result will be accomplished when the totalizer is moved downwardly into contact with the rack 155 instead of upwardly. This will rotate the totalizer units in the opposite or subtracting direction. The carrying mechanism will operate regardless of the direction in which the totalizer is being moved, because when the tooth 195 passes the tooth 194 it will move one or the other of the lugs 196 downwardly to trip the lever 189, whether the tooth 195 is moving in an adding or a subtracting direction. In case the totalizer is set for subtraction, the carrying mechanism will subtract one from the higher decimal order for each revolution of the totalizer unit of the lower decimal order. After the carrying operation is completed, and the totalizer moved to its central position, the side plates and the totalizer units carried thereby are returned to their normal position, by means of cams 199 secured to the shaft 75, during the latter part of the rotation of that shaft. The cams 199 coöperate with lugs 200 (Fig. 19) to force the side plates into their normal position against the tension of the springs 186. As soon as they have been returned by the cams 199 the locking members 189 spring into position to hold them.

The bar 168 is secured at each end thereof to a slide 201 (Figs. 8, 22 and 24). These slides 201 are normally pressed downwardly by springs 202 against cams 203 carried on a sleeve 204 slidably mounted on a shaft 205 but restrained to rotate therewith. The cams 203 include 3 separate cam members 206, 207 and 208. The member 207 is of uniform diameter throughout and the member 206 is notched as at 209, (Fig. 22) and the member 208 carries a projection 210. The shaft 205 carries a gear 212 connected by a train of gearing 211 to the shaft 75. It will thus be apparent that the shaft 205 is given a complete revolution during the return stroke of the hand crank 85. When the cam members 206 are in position to coöperate with the projection 213 on the slides 201, it will be apparent that as soon as the shaft 205 begins to rotate the projection 213 will drop into the notch 209 and thus move the pinions 163 into contact with the rack teeth 158. They will remain in this position until after the racks have been released in the manner previously described, and the totalizer operated to subtractingly insert the number therein that is being printed in the recording device. After sufficient time has been given for the movement of the racks forwardly, the cam members 206 will again raise the slides 201 and return the totalizer units to their central or inoperative position, where they will remain during the return movement of the racks. When the cam members 208 are in position to coöperate with the slides 201, the totalizers will be moved upwardly by the projections 210 into contact with the teeth 159 and an adding instead of a subtracting operation will take place. The sleeve 204 may be slid longitudinally on the shaft 205 to set either the cam members 206 or 208 in operative position by means of levers 214. One lever 214 is provided for each totalizer. The levers 214 are pivoted at 215 (Figs. 26 and 28) and carry at their lower end gear segments 216 coöperating with teeth 217 on shafts 218. The shafts 218 extend parallel to the racks 155 (Fig. 22) and have mutilated gears 219 in position to coöperate with circular teeth 220 carried by the sleeves 204 (Figs. 22 and 24). It will be apparent that the levers 214 may be moved either to the right or to the left to set the totalizer for adding or subtracting position by shifting the sleeve 204 to move the cams 203. Detents 221 (Fig. 28) coöperate with notches 222 carried by a disk 223 mounted on the lever 214. These detents prevent accidental displacement of the levers 214 from any position in which they may be set. Cam members 224 are mounted on the shaft 75 in position to coöperate with projections 225 carried by the levers 214. As will be apparent from Figs. 27 and 28, the cam members 224 are of such shape that in whatever direction the levers 214 are moved, they will be permitted to remain in the position in which they are set during a partial revolution of the shaft 75, and will then be returned by the inclined portions 226 of the cam members 224 to their central position. This will take place immediately after the slides 201 have been returned to their central position. A slide 227 is operatively connected with each of said levers 214 (Fig. 28) to be simultaneously moved with the lever. These slides carry at their opposite ends notched members 228 which extend over the ends of the levers 99 (Figs. 15 and 28). When a lever 214 is moved in either direction, the notched member 228 corresponding to the lever 214 moved, will press downwardly on the end of the lever 99 and release one of the sliding type bars 98 so that it will be free when the shaft 75 begins to rotate to print a letter corresponding to the particular lever 214 which is operated, and the totalizer controlled by said lever.

When it is desired to enter in a totalizer of any particular salesman, the record of a sale other than one in which the computing scale is used, the key-board 151 is used for this purpose. In this key-board, a bank of keys 230, nine in number, is provided for each rack 155. When one of the keys 230 is pressed downwardly, it coöperates with one of the projections 231 on the corresponding rack 155 and arrests the movement of that rack when it has moved a distance proportional to the digit which the depressed key bears. Each bank of keys is provided with a lock bar 232 pivotally supported at 233 and normally held in position to coöperate with projections 234 on the keys 230. It will be apparent that when a key 230 is depressed, the lock bar 232 will swing into position above the projection 234 and hold it in its depressed position. The lower end of the key 236 will thus be held in position against the tension of the spring 237 to coöperate with a projection 231 on the rack 155. If, after a key in any bank has been depressed, another key in the same bank is depressed, the lock bar 232 will be swung outwardly and the key previously depressed will be released. Thus, if an error has been made in depressing the wrong key, it is only necessary in correcting the error to depress the correct key. A bar 238 extends crosswise of the lock bars 232 and is provided with a series of notches 239 coöperating with the lock bars 232 to swing them out of operative position. A spring 240 normally draws the bar 238 in the direction to move the lock bars 232 into operative position. A key 241 bearing a cam member 242 adapted to coöperate with a projection 243 on the bar 238, is provided for sliding the bar 238 against the tension of the spring 240 to simultaneously release all of the keys 230 in case a wrong number has been set up on the key-board, and it is desired to correct the error. A locking member 244 is secured to each of the pivots 233 carrying the lock bar 232 to rotate therewith. Each of the lock bars 244 is adapted to coöperate with a notch 245 in the rack corresponding therewith to hold the rack from movement in case no key is depressed in the bank of keys corresponding to a particular rack. The key-board and rack arrangement just described is that commonly used in adding machines and no novelty is claimed in this application in connection therewith, except as it enters into the general combination.

It is desirable to be able to set the totalizers and printing mechanism so that they may be controlled either by the computing scale or by the key-board, and mechanism for accomplishing this result will now be described. A shaft 28 (Figs. 2, 4, 6, 22 and 29) extends longitudinally along the front of the scale drum and projects through the casing into the totalizer space. This shaft 28 carries a lever 250 by which it is adapted to be given a partial rotation. A mutilated gear 251 is slidably mounted on the shaft 28 but is constrained to rotate therewith. The teeth of the gear 251 mesh with rack teeth 252 (Fig. 4) which are connected to the spring pressed plate 253 which carries the slides 35, 36 and 37. It will be apparent from Fig. 4 that when the lever 250 is moved to rotate the shaft 28 to the left, as viewed in Fig. 4, the slides 35, 36 and 37 will be moved out of mesh with the gears 50, 51, and 52, and so the shafts $a$, $b$ and $c$ will be free to rotate independently of the slides and the computing scale. The slides, however, are normally held in mesh with the gears 50, 51 and 52 by means of the spring pressed plate 253. When the lever 250 is moved to rotate the shaft 28 to disconnect the computing scale in the manner just described, it is automatically locked in the disconnecting position by means of a spring catch 255 (Fig. 29). This spring catch is forced into holding position in contact with the notch 256 carried by the member 257 rigidly mounted on the end of the shaft 28. A spring 258 coöperates with the member 257 normally tending to return the shaft to its original position. A projection 259 on the spring catch 255 is in position to coöperate with a tooth 260 carried by the shaft 75. When the lever 250 has been set to disconnect the computing scale, and the totalizer has been operated by means of the key-board and other mechanism previously described, the final part of the rotation of the shaft 75 will bring the tooth 260 into contact with the projection 259 and force the catch 255 out of the notch 256 and thus free the shaft 28 to return to its original position. It will thus be seen that after each operation of the device, the shaft 28 is automatically rotated to connect the totalizer and the printing mechanism with the computing scale. It will therefore be necessary to move the lever 250 each time it is desired to operate the mechanism independently of the computing scale. During the operation of the device under the control of the computing scale it is desirable to hold the keys 230 in inoperative position, so that the racks will be free to move unrestrained by any of the keys. To do this the bar 238 (Fig. 25) is normally held to the left in Fig. 25. When the bar 238 is in this position, if a key 230 is depressed, the lock bars 232 cannot coöperate with the notches 234 and the key will be immediately withdrawn to its upper position by the spring 237. The locking members 244 will also be held in inoperative position, being constrained to move with the members 232. This bar 238 is held in the position described by means of a lug 261 on the shaft 262 which coöperates with a projection 263 on the bar 238 (Figs. 25 and 29). A spring 264 normally tends to rotate the shaft 262 to free the bar 238 from the influence of the lug 261. The shaft 262 is held from rotation by a lug 265 carried at the opposite end of the shaft 262 and coöperating with a projection 266 fastened to the member 257 which is carried on the shaft 28 to rotate therewith. It will be apparent that when the lever 250 is moved to disconnect the computing scale, the projection 266 will be moved downwardly, permitting the rotation of the shaft 262 and movement of the bar 238 to permit the locking bars of the key-board to move into operative position. It will thus be seen that simultaneously with the disconnection of the computing scale, the key-board will be placed in operative position. Also it will be seen that when the computing scale is thrown into operative connection the keyboard will be rendered inoperative. As has been previously stated, only three of the shafts which control the totalizers coöperate with the computing scale. It will therefore be necessary to prevent rotation of the remaining shafts $d$ and $e$ during the operation of the computing scale. This is accomplished by means of projections 267 which extend into notches cut in the members 268 carried by the shafts $d$ and $e$ (Fig. 29). Connected with the shaft 28 is a cam member 269 adapted to coöperate with a projection 270 on the shaft 271 which carries the projections 267. It will be seen from the drawing that when the lever 250 is moved to disconnect the computing scale, the cam member 269 will simultaneously rotate the shaft 271 and free the shafts $d$ and $e$ from the projections 267 and thus place the shafts $d$ and $e$ in condition to operate under the control of the key-board.

It is desirable in the operation of a device of this character, that the purchaser and others in the store-room should be able to see the total value of a purchase being made. To accomplish this, each totalizer casing is provided with an extension 275 in which is mounted a shaft 276 (Fig. 22). This shaft carries a series of wheels 277 (Figs. 22 and 24) and secured to each of these wheels is a pinion 278 meshing with teeth 279 on the racks 281 supported by the extensions 161 of the racks 155. It will be apparent that the wheels 277 will be rotated an angular distance equal to that of the corresponding totalizer numeral wheel. Numerals similar to those carried on the totalizer numeral wheels are placed on the periphery of the wheels 277 and openings 280 are provided in the casing, through which the customer may see the numeral wheels and read the total value of a purchase made at the same time that the salesman sees the total through the openings 185 on the opposite side of the casing. Since the numbers on the wheels 277 are viewed from the opposite direction from that in which those on the totalizer wheels are viewed it will be apparent that the wheels 277 must be arranged in reverse order to that of their corresponding driving racks in order to bring the units wheel on the right to one reading the numbers shown by these wheels, and to bring the other decimal orders in their proper positions. To accomplish this the units rack 155 carries a laterally extending bar 282 which carries the rack 281 for driving the wheels 277 at the opposite side of the totalizer. In like manner an extension 283 connects the rack of the highest decimal order with the wheel 277 opposite the units rack. Other extensions 284 and 285 connect corresponding wheels and rack. The central wheel is driven directly by the central rack. The wheels 277 and the numerals carried thereby are made of a sufficient size so that they are plainly visible from a considerable distance, so that others in the store-room may see the value of the purchase being made, and thus form a check on any collusion between the customer and the salesman for defrauding the company.

The operation of the various parts of the device has been described in connection with the description of these parts, and it is believed that the operation of the invention as a whole will be readily understood. Briefly the operation is as follows: If an article is to be sold by weight, it is placed upon the scale pan by the salesman who then moves the lever 214 to the left, as shown in Fig. 3, to place the cams 203 in proper position to move the totalizer in adding direction upon operation of the hand crank 85. Simultaneously with the movement of the cams 203, the catch lever 99 will be moved out of engagement with the printing bar 98 which bears the letter characteristic of the totalizer which is set in operative position. Since the cams 203 in the other totalizer will not be shifted, the slides 201 will remain in position to hold the totalizer units of the totalizers not being operated in their central or inoperative positions. In this way, the value will be set up in only one of the totalizers, namely the one to which the particular salesman is assigned, and the one for which the characteristic letter is printed. After the salesman has moved the lever 214 corresponding to his characteristic letter, he sets the index member 30 opposite the price at which the article is to be sold. Simultaneously with this setting of the index member 30, the index fingers 31 and 45 are moved to indicate to the salesman and customer the price at which the article is to be sold. The operator now pulls forwardly on the lever 85 and allows it to return. The forward movement of the lever 85 locks the disks 12 and rotates the scale drum a distance proportional to the weight of the article. The return movement of the lever 85 frees the shaft $a$, $b$ and $c$ and permits their rotation until they are checked by the slides 35, 36 and 37 contacting with the scale drum. In this way numbers are set up in the printing mechanism and inserted in the totalizer corresponding with the value of the article upon the scale pan. Further movement of the handle 85 on its return stroke frees the printing hammers to print the value thus set up and finally restores the various parts to their initial position, with the exception that the totalizer units are allowed to remain in the position to which they have been rotated and consequently have added thereto the number representing the value of the article sold. During this operation, the wheels 277 have been moved to indicate through the openings 280 in the casing, the value of the purchase made. Since these wheels remain in contact with the rack 279, they will be returned after each operation to the zero position. After the lever 85 has returned to its initial position, the ticket which has been printed and moved past the knife 127 will be torn off by the salesman and handed to the customer who will take the ticket to the cashier when he pays for his purchase. If a number of sales are made to the same customer, the ticket may not be torn off until each sale has been recorded in the manner described, and then the entire ticket may be torn off and given to the customer. If an article not sold by weight is to be purchased, the lever 250 is pulled forwardly by the salesman, thus disconnecting the computing scale and placing the key-board in operative relation with the device. The keys are then depressed to represent the value of the article and the handle 85 pulled forwardly the same as previously described.

It is understood that at the beginning of each day the date is set up in the printing mechanism by means of the slides 60. At the close of each day or of any other period, the total sales of each individual salesman will be shown in his totalizer. The totalizer may then be set in subtracting position and the number appearing in the totalizer set up upon the keyboard and the handle operated as is done in making a sale. This operation will subtract from the totalizer a number corresponding to the total value of the sales made and will of course leave the totalizer in the zero position ready for the next day's sales. The total sales made by the particular salesman, will be simultaneously printed together with his characteristic letter. This operation is repeated for each totalizer and the slip thus obtained will serve as a memorandum for the company to show the total sales of each salesman for a given day. Instead of making a record of the total sales of each individual salesman, it may be desidable to make a record of the total sales of all of the salesmen. To do this, one of the totalizers is set in subtracting position and another totalizer is set in adding position. The number shown on the totalizer which has been set in subtracting position is now set up on the key-board, the scale having first been disconnected, of course, and the lever 85 is operated. It will be apparent that the two totalizers will now be operated simultaneously and the number set up on the key-board will be subtracted from one, leaving that totalizer with all of its units set at zero. At the same time this same number will be inserted in the totalizer set in adding position, which will now show the total of the two totalizers. If there are more than two totalizers on the machine, this operation is repeated until the readings of all the totalizers are inserted in the totalizer which has been operated addingly. This totalizer will now be set for subtraction and the grand total which it now shows will be set up on the key-board and the totalizer operated by the handle 85. This operation will print the grand total and simultaneously clear the final totalizer. It will thus be seen that a grand total has been obtained simultaneously with the process of clearing the various totalizers.

What I claim is:

1. In a device of the character described, a totalizer, a computing scale, a key-board and means for selectively connecting said totalizer with said computing scale and with said key-board to be controlled thereby.

2. In a device of the character described, a key-board, a totalizer adapted to be controlled by said key-board, a weighing scale adapted to control said totalizer, and means for normally preventing the control of said totalizer by said key-board.

3. In a device of the character described, scale controlled computing mechanism, means for totalizing a plurality of readings of said mechanism, a key-board operable independently of said mechanism, and means for connecting said key-board with said totalizing means to control the operation of said totalizing means and to insert numbers other than the readings of said computing mechanism in the total shown by said totalizing means.

4. In a device of the character described, a totalizer, a computing scale, a key-board, racks for operating said totalizer, means controlled by said key-board for limiting the movements of said racks, means controlled by said scale for limiting the movements of said racks, and means for selectively connecting said racks with the limiting means controlled by said computing scale and said key-board respectively for selectively inserting in said totalizer the readings of said computing scale and numbers set up on said key-board.

5. In a device of the character described, a totalizer, a computing scale, means normally connecting said totalizer to said computing scale to be controlled thereby, a key-board adapted to control said totalizer, means normally holding said key-board inoperative, and means for disconnecting said computing scale from said totalizer, and simultaneously rendering said key-board operative to control said totalizer.

6. In a device of the character described, a totalizer, a computing scale, means normally connecting said totalizer with said computing scale to be controlled thereby, a key-board adapted to control said totalizer, means normally preventing the control of said totalizer by said key-board, means for disconnecting said computing scale from said totalizer, and simultaneously connecting said key-board with said totalizer, and means for automatically restoring said connections to their normal position after the operation of said totalizer.

7. In a device of the character described, a totalizer having a plurality of totalizer units for different decimal orders, separate means for operating each of said totalizer units, a series of keys for each of said operating means adapted to control the movement thereof, a gear for moving each of said operating means, a scale, means operated by said scale for controlling the movement of said gears, and means for alternatively placing said gear controlling means and said keys in operative connection with said totalizer units.

8. In a device of the character described, a plurality of totalizer units, a rack for operating each of said totalizer units, a gear for moving each of said racks, a computing scale, a device coöperating with said computing scale for controlling the movement of said gears, a plurality of keys adapted to control the movement of each of said racks, control means normally preventing the operation of said keys, and means for disconnecting said gear controlling device and simultaneously moving said key control means to permit operation of said keys.

9. In a device of the character described, scale controlled computing mechanism for ascertaining products of a plurality of factors, a plurality of totalizers each having a plurality of units of different decimal orders, a plurality of shafts for operating said totalizers, there being one shaft for driving all of the totalizer units of the same decimal order in the different totalizers, and means for selectively connecting said totalizers with said driving shafts for inserting a product ascertained by said computing mechanism in any one of said totalizers.

10. In a device of the character described, scale controlled computing mechanism comprising means for ascertaining products of a plurality of factors, a plurality of totalizers each having totalizer units of different decimal orders, a plurality of shafts controlled by said computing mechanism each of said shafts corresponding to a given decimal order and arranged to drive the totalizer units of said decimal order in the different totalizers, mechanism for connecting the totalizer units of any one of said totalizers with said drive shafts to be driven thereby, and means for automatically disconnecting said totalizer units from said drive shafts at the close of a computing operation.

11. In a device of the character described, a plurality of totalizers each having a series of totalizer units corresponding to different decimal orders, separate means for operating each of said totalizer units, a computing scale comprising mechanism for ascertaining products of a plurality of factors, means connecting said totalizer unit operating means with said computing scale, means for moving certain totalizer units into operating connection with said totalizer operating means, and means for automatically moving said totalizer units out of operative connection with said totalizer unit operating means after an operation of said totalizer.

12. In a device of the character described, a totalizer comprising a plurality of totalizer units, a rack for operating each of said totalizer units, a shaft coöperating with each of said racks for moving the same, a computing scale for controlling the movement of said shafts, means for establishing operative relation between said racks and said totalizer units, and means for automatically breaking said operative relation after each operation of said totalizer.

13. In a device of the character described, a plurality of totalizers each comprising a plurality of totalizer units corresponding to different decimal orders, common driving means for the totalizer units of the same decimal order of the different totalizers, a computing scale for controlling the movement of said driving means, means for selectively connecting the driving means with the totalizer units of a single one of said totalizers at one time, and means for automatically disconnecting said driving means from said totalizer units after an operation of said totalizer.

14. In a device of the character described, a plurality of totalizers each comprising a series of totalizer units, the units of each series corresponding to different decimal orders, a rack for operating each of said totalizer units, a common driving means for the racks of the different totalizers of the same decimal order, a key-board having a key bank for controlling the movement of each of said driving means, a computing scale having means for controlling the movement of each of said driving means and means for selectively placing said key-board and said computing scale into operative relation with said driving means.

15. In combination, a computing scale, a key-board having separate keys for the digits of the different decimal orders of numbers set up therein, means for ascertaining combined totals of values of articles weighed on said scale and values set up on said key-board.

16. In a device of the character described, a computing scale, a key-board, means for exhibiting readings of said computing scale and numbers set up in said key-board and mechanism for selectively connecting at the will of the operator said exhibiting means with said computing scale and said key-board.

17. In a device of the character described, a computing scale, a key-board having separate keys for the digits of the different decimal orders of numbers set up therein, and means for selectively exhibiting readings of said scale or numbers set up in said key-board, said exhibiting means comprising numeral wheels of different decimal orders, and means for rotating said wheels to bring the numerals thereon into position to represent a number set up in said key-board or a reading of said scale.

18. In combination, a computing scale comprising a weighing device and computing mechanism, an index adapted to be set by the operator at the price at which an article placed upon said scale is to be sold, a separate index arranged at the side of said scale opposite said first-named index and movable in unison with said first named index to indicate said price to a customer and a flexible band extending around said scale and connecting said indices with one another.

19. In combination, a computing scale comprising a weighing device and mechanism for computing values, a plurality of totalizers, common driving mechanism for said totalizers controlled by said computing mechanism for transmitting a value computed by said mechanism to one of said totalizers, keys for connecting each of said totalizers with said driving mechanism to permit the insertion in said totalizers of numbers ascertained by said computing mechanism, means for recording said numbers, means for recording characters corresponding to each of said totalizers, and mechanism operated by said keys for controlling said character-recording means to cause a character to be recorded simultaneously with the recording of a computed number, the character recorded being the one corresponding with the totalizer in which said number is inserted.

20. In a device of the character described, a plurality of totalizers, a computing scale, means for selectively inserting readings of said computing scale in any one of said totalizers, a key-board, means for selectively inserting a number set up in said key-board in any one of said totalizers, and means for recording a character corresponding to the totalizer in which a number is inserted.

21. In a device of the character described, a plurality of totalizers, a computing scale, means for selectively inserting in any one of said totalizers a reading of said computing scale, separate means for selectively inserting in any one of said totalizers a number other than said reading, means for recording the numbers inserted in said totalizers, and means for simultaneously recording a character corresponding to the totalizer in which said number is inserted.

22. In a device of the character described, a plurality of totalizers, a computing scale, a key-board, operating mechanism for said totalizers, means for selectively connecting said computing scale and said key-board with said operating mechanism to control the same, a device associated with each of said totalizers for connecting it with said operating mechanism to be operated thereby, and means for recording a character corresponding to the totalizer so connected.

23. In a device of the character described, a plurality of totalizers, means for driving said totalizers, a computing scale adapted to control said driving means, a lever associated with each of said totalizers adapted to connect said totalizer with said operating means, a type-carrying member for each of said totalizers, and means controlled by said levers for releasing said type-carrying members to permit operation thereof.

24. In a device of the character described, a printing mechanism comprising a plurality of type segments, a computing scale adapted to control said type segments, a totalizer adapted to be controlled by said computing scale, means for operatively connecting said totalizer with said computing scale, an additional type member, and means connecting said totalizer with said additional type member to place said additional type member in operative position simultaneously with the operation of said type segments.

25. In a device of the character described, a plurality of shafts, pinions on said shafts, a totalizer having a plurality of totalizer units, a rack adapted to operate each of said totalizer units, each of said racks meshing with a pinion on one of said shafts, a computing scale, slides coöperating with said computing scale for controlling said shafts, and means for driving said shafts.

26. In a device of the character described, a totalizer, a plurality of shafts adapted to control the operation of said totalizer, a computing scale adapted to control the operation of some of said shafts, means for controlling the other of said shafts independently of said scale, and means for holding the others of said shafts inoperative during the control of said first mentioned shafts by said computing scale.

27. In a device of the character described, a plurality of shafts, a totalizer adapted to be controlled by said shafts, a computing scale adapted to control the operation of some of said shafts, a key-board adapted to control the operation of all of said shafts, means for preventing the operation of said key-board during the operation of the computing scale, and means for holding the shafts not controlled by the computing scale stationary during the operation of the computing scale.

28. In a device of the character described, a totalizer, a plurality of shafts adapted to control the operation of said totalizer, a computing scale adapted to control the operation of said shafts, a key-board adapted to control the operation of said shafts, and means for normally connecting said shafts with said computing scale and for preventing the operation of said key-board.

29. In a device of the character described, a plurality of shafts, a plurality of totalizers adapted to be selectively connected to said shafts to be controlled thereby, and a computing scale normally connected with said shafts to control the operation thereof.

30. In a device of the character described, a recording mechanism a computing scale, a key-board, means for selectively connecting said recording mechanism with said computing scale and said key-board to record readings of said computing scale, and numbers set up in said key-board, and means for simultaneously recording a date.

31. In a device of the character described, a recording mechanism, a computing scale, a totalizer, a key-board, and means for simultaneously connecting said recording mechanism and said totalizer selectively with said computing scale or said key-board to record a number set up in said key-board or indicated by said scale, and simultaneously enter said number in said totalizer.

32. In a device of the character described, a recording mechanism, a plurality of totalizers, a computing scale, means controlled by said computing scale for setting up a number in said recording mechanism, means for printing said number, and means for simultaneously printing a character corresponding to said totalizer and the date of said operation.

33. In a device of the character described, a weighing scale, means for exhibiting on opposite sides of said scale the weight of an article placed thereon, means for exhibiting on opposite sides of said scale the price at which said article is to be sold, and means for exhibiting on one side of said scale the value of said article at the price so exhibited.

34. In a device of the character described, a computing scale, means for exhibiting on opposite sides of said scale the price of an article to be weighed thereon, means for exhibiting the value of said article at said price, means for recording said value and means for exhibiting the total of values so recorded.

35. In a device of the character described, a computing scale, means for exhibiting the weight of an article placed upon said scale, means for exhibiting on opposite sides of said scale the price at which said article is to be sold, means for exhibiting the value of said article at said price, means for recording values so exhibited, and means for exhibiting totals of values so recorded.

36. In a device of the character described, a totalizer having a plurality of totalizer units, racks for operating said totalizer units, a computing scale for controlling the movement of said racks, and additional numeral wheels of relatively larger size than the numeral wheels of said totalizer and located in position to bring the numerals thereon in easy view of a customer, said numeral wheels being operated by said racks to exhibit the number inserted in said totalizer at each operation thereof.

37. In a device of the character described, a computing scale, a plurality of totalizers controlled by said computing scale, means for independently setting said totalizers for adding or subtracting operations, and means for simultaneously operating said totalizers.

38. In a device of the character described, a computing scale, a totalizer adapted to be controlled by said computing scale, means other than said computing scale for controlling said totalizer and means for setting said totalizer for adding or subtracting operations.

39. In a device of the character described, a totalizer, a computing scale, means for inserting in said totalizer readings of said computing scale, means for inserting in said totalizer numbers other than said readings, and means for setting said totalizer for adding or subtracting operations.

40. In a device of the character described, a computing scale, a plurality of totalizers, means for inserting in any one of said totalizers, readings of said computing scale, means for inserting in any one of said totalizers numbers other than the readings of said computing scale, and means for independently setting said totalizers for adding or subtracting operations.

41. In a device of the character described, a plurality of simultaneously operable totalizers, means for independently setting said totalizers for adding or subtracting operations, and a computing scale for controlling the operation of said totalizers.

42. In a device of the character described, a plurality of simultaneously operable totalizers, a computing scale for controlling the operation of the said totalizers and means for recording the numbers inserted in said totalizers.

43. In a device of the character described, a plurality of simultaneously operable totalizers, a computing scale for controlling the operation of said totalizers, means for independently setting said totalizers for adding or subtracting operations and means for recording numbers inserted in said totalizers.

44. In a device of the character described, a plurality of totalizers operable simultaneously to perform some adding and some subtracting operations, and a computing scale for controlling the operation of said totalizers.

45. In a device of the character described a plurality of totalizers, means for operating said totalizers simultaneously for performing an adding operation by some and a subtracting operation by other of said totalizers, and a weighing scale for controlling the operation of said totalizers.

46. In a device of the character described, a computing scale, a plurality of totalizers controlled by said computing scale, and means for simultaneously adding a number to the total in one of said totalizers and subtracting said number from the total in another of said totalizers.

47. In a device of the character described, a plurality of totalizers, common means for operating said totalizers a weighing scale for controlling said operating means and means for setting said totalizers to operate simultaneously a part to perform an adding and a part to perform a subtracting operation.

In testimony whereof I have signed my name to this specification, in the presence of two subscribing witnesses, on this 17th day of February, A. D. 1915.

OTTO MALCHER.

Witnesses:
NANCY DILLON,
A. J. CRANE.